United States Patent
Shey et al.

(10) Patent No.: US 11,912,105 B2
(45) Date of Patent: Feb. 27, 2024

(54) HEAT PUMP FOR A VEHICLE

(71) Applicant: Ford Global Technologies, LLC, Dearborn, MI (US)

(72) Inventors: Rachael Shey, Clawson, MI (US); Jeffrey Paul Brown, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 17/495,964

(22) Filed: Oct. 7, 2021

(65) Prior Publication Data

US 2023/0114381 A1  Apr. 13, 2023

(51) Int. Cl.

| B60H 1/00 | (2006.01) |
|---|---|
| B60H 1/32 | (2006.01) |
| F25B 41/20 | (2021.01) |
| F25B 41/24 | (2021.01) |
| F25B 41/31 | (2021.01) |
| F25B 41/40 | (2021.01) |
| F25B 30/02 | (2006.01) |

(52) U.S. Cl.
CPC ..... B60H 1/00899 (2013.01); B60H 1/00885 (2013.01); B60H 1/32284 (2019.05); F25B 41/20 (2021.01); F25B 41/24 (2021.01); B60H 2001/00928 (2013.01); B60H 2001/00949 (2013.01); F25B 30/02 (2013.01); F25B 41/31 (2021.01); F25B 41/40 (2021.01)

(58) Field of Classification Search
CPC ............ B60H 1/00899; B60H 1/00885; B60H 1/32284; B60H 2001/00928; B60H 2001/00949; B60H 1/00921; B60H 1/3223; F25B 41/20; F25B 41/24; F25B 30/02; F25B 41/31; F25B 41/40; F25B 2339/047; F25B 2400/13; F25B 41/30; F25B 41/42

See application file for complete search history.

(56) References Cited

U.S. PATENT DOCUMENTS

| 5,291,941 A  * | 3/1994 | Enomoto ............. B60H 1/3205 |
|---|---|---|
| | | 237/12.3 B |
| 6,920,922 B2 | 7/2005 | Takeuchi |
| 7,992,400 B2 * | 8/2011 | Uno ....................... F04C 11/008 |
| | | 62/238.6 |
| 9,562,712 B2 * | 2/2017 | Kasuya ................. F25B 47/022 |
| 9,612,041 B2 | 4/2017 | Kawakami et al. |

(Continued)

FOREIGN PATENT DOCUMENTS

DE  102020103340 A1 *  8/2020  ......... B60H 1/00007

*Primary Examiner* — Ljiljana V. Ciric

(74) *Attorney, Agent, or Firm* — Vichit Chea; Price Heneveld LLP

(57) ABSTRACT

A heat pump includes a refrigerant loop. The refrigerant loop includes a first heat exchanger, a first region of a second heat exchanger, a third heat exchanger, a fourth heat exchanger, a compressor, a vapor generator, a first check valve, and a second check valve. The compressor includes a low-pressure inlet, a mid-pressure inlet, and an outlet. The vapor generator is positioned downstream of the outlet of the compressor and upstream of both the low-pressure inlet and the mid-pressure inlet. The first check valve is positioned immediately downstream of the third heat exchanger. The second check valve is positioned immediately downstream of the fourth heat exchanger.

20 Claims, 12 Drawing Sheets

(56) References Cited

U.S. PATENT DOCUMENTS

| | | |
|---|---|---|
| 9,786,964 B2 | 10/2017 | Takeuchi et al. |
| 10,036,562 B2 * | 7/2018 | Takenaka ................ F25B 49/02 |
| 10,391,835 B2 | 8/2019 | Blatchley et al. |
| 10,465,952 B2 * | 11/2019 | He ........................ F25B 47/022 |
| 10,737,552 B2 * | 8/2020 | He .......................... F25B 41/20 |
| 11,110,778 B2 * | 9/2021 | Semel ..................... F25D 21/06 |
| 11,128,136 B2 * | 9/2021 | Abaitancei .............. F15B 1/027 |
| 11,236,934 B2 * | 2/2022 | Tashiro ................... F25B 41/31 |
| 11,560,042 B2 * | 1/2023 | Brown ................. B60H 1/32284 |
| 11,629,890 B1 * | 4/2023 | Vaisman ................... F25B 5/02 |
| | | 62/199 |
| 11,629,901 B1 * | 4/2023 | Vaisman ................. F25B 43/00 |
| | | 62/115 |
| 11,639,818 B2 * | 5/2023 | Vaisman ................. F25B 41/24 |
| | | 62/159 |
| 11,644,221 B1 * | 5/2023 | Vaisman ............ B60H 1/00899 |
| | | 62/115 |
| 11,698,210 B1 * | 7/2023 | Vaisman ................. F25B 39/00 |
| | | 62/160 |
| 11,732,941 B1 * | 8/2023 | Vaisman ................. F25B 41/24 |
| | | 62/117 |
| 2012/0017637 A1 | 1/2012 | Nakajo et al. |
| 2020/0290429 A1 | 9/2020 | Blatchley et al. |
| 2021/0395109 A1 * | 12/2021 | LaRocque ............... C02F 1/048 |
| 2022/0252314 A1 * | 8/2022 | Tashiro ................... F25B 47/02 |
| 2022/0404081 A1 * | 12/2022 | Vaisman ................. F25B 41/31 |
| 2022/0412611 A1 * | 12/2022 | Brown .................. F25B 49/022 |
| 2023/0026371 A1 * | 1/2023 | Swain ................... F28F 9/0275 |
| 2023/0109595 A1 * | 4/2023 | Brown .................... F25B 41/24 |
| | | 62/244 |
| 2023/0113540 A1 * | 4/2023 | Shey ....................... F25B 41/42 |
| | | 62/324.6 |
| 2023/0114381 A1 * | 4/2023 | Shey .................. B60H 1/00885 |
| | | 62/324.1 |
| 2023/0126723 A1 * | 4/2023 | Shey .................... B60H 1/3223 |
| | | 62/160 |
| 2023/0131019 A1 * | 4/2023 | Shey .................. B60H 1/00278 |
| | | 62/160 |
| 2023/0182535 A1 * | 6/2023 | Shey .................. B60H 1/00885 |
| | | 62/160 |
| 2023/0194129 A1 * | 6/2023 | Shey .................. B60H 1/00921 |
| | | 62/498 |
| 2023/0349597 A1 * | 11/2023 | Shey ..................... F25B 25/005 |
| 2023/0366591 A1 * | 11/2023 | Shey ....................... F25B 41/24 |
| 2023/0366595 A1 * | 11/2023 | Shey ....................... F25B 40/00 |

* cited by examiner

HEAT PUMP FOR A VEHICLE

FIELD OF THE DISCLOSURE

The present disclosure generally relates to a heat pump. More specifically, the present disclosure relates to a heat pump for a vehicle.

BACKGROUND OF THE INVENTION

Heat pumps have been employed in vehicles. A refrigerant loop can be included in such heat pumps.

SUMMARY OF THE INVENTION

According to a first aspect of the present invention, a heat pump includes a refrigerant loop. The refrigerant loop includes a first heat exchanger, a first region of a second heat exchanger, a third heat exchanger, a fourth heat exchanger, a compressor, a vapor generator, a first check valve, and a second check valve. The compressor includes a low-pressure inlet, a mid-pressure inlet, and an outlet. The vapor generator is positioned downstream of the outlet of the compressor and upstream of both the low-pressure inlet and the mid-pressure inlet. The first check valve is positioned immediately downstream of the third heat exchanger. The second check valve is positioned immediately downstream of the fourth heat exchanger.

Embodiments of the first aspect of the invention can include any one or a combination of the following features:
- the refrigerant loop further includes a first three-way valve positioned downstream of the outlet of the compressor and upstream of an inlet of the first heat exchanger, wherein the first three-way valve is positioned upstream of the first region of the second heat exchanger;
- the refrigerant loop further includes a second three-way valve positioned immediately downstream of the first heat exchanger;
- the refrigerant loop further includes a third three-way valve positioned immediately upstream of the third heat exchanger;
- the refrigerant loop further includes an accumulator positioned immediately upstream of the low-pressure inlet of the compressor;
- the refrigerant loop further includes a first shutoff valve plumbed in series with the first heat exchanger, wherein the first shutoff valve is positioned downstream of the first heat exchanger;
- the refrigerant loop further includes a second shutoff valve plumbed in series with a second region of the vapor generator, wherein the second shutoff valve is positioned downstream of the second region of the vapor generator;
- the refrigerant loop further includes a third shutoff valve positioned downstream of a second three-way valve, wherein the second three-way valve is positioned immediately downstream of the first heat exchanger and immediately downstream of the second shutoff valve;
- the vapor generator is a liquid-gas separator valve;
- the vapor generator is a plate-style heat exchanger;
- the refrigerant loop further includes a first expansion valve positioned upstream of a first region of the vapor generator;
- the refrigerant loop further includes a second expansion valve positioned upstream of the first heat exchanger;
- the refrigerant loop further includes a third expansion valve positioned upstream of the third heat exchanger;
- the refrigerant loop further includes a fourth expansion valve positioned immediately upstream of the fourth heat exchanger; and
- a coolant loop that includes a second region of the second heat exchanger, a pump, a fifth heat exchanger, a reservoir, and a coolant network of conduits that fluidly couples components of the coolant loop.

According to a second aspect of the present disclosure, a heat pump includes a refrigerant loop. The refrigerant loop includes a first heat exchanger, a first region of a second heat exchanger, a third heat exchanger, a fourth heat exchanger, a compressor, a vapor generator, a first check valve, and a second check valve. The compressor includes a low-pressure inlet, a mid-pressure inlet, and an outlet. The vapor generator is positioned downstream of the outlet of the compressor and upstream of both the low-pressure inlet and the mid-pressure inlet. The first check valve is positioned immediately downstream of the third heat exchanger. The second check valve is positioned immediately downstream of the fourth heat exchanger. The refrigerant loop further includes a first three-way valve, a second three-way valve, a first shutoff valve, a second shutoff valve, and a third shutoff valve. The first three-way valve is positioned downstream of the outlet of the compressor and upstream of an inlet of the first heat exchanger. Additionally, the first three-way valve is positioned upstream of the first region of the second heat exchanger. The second three-way valve is positioned immediately downstream of the first heat exchanger. The third three-way valve is positioned immediately upstream of the third heat exchanger. The first shutoff valve is plumbed in series with the first heat exchanger and the first shutoff valve is positioned downstream of the first heat exchanger. The second shutoff valve is plumbed in series with a second region of the vapor generator and the second shutoff valve is positioned downstream of the second region of the vapor generator. The third shutoff valve is positioned downstream of the second three-way valve. The second three-way valve is positioned immediately downstream of the second shutoff valve.

Embodiments of the second aspect of the present disclosure can include any one or a combination of the following features:
- the vapor generator is a liquid-gas separator valve;
- the vapor generator is a plate-style heat exchanger;
- the refrigerant loop further includes a first expansion valve positioned upstream of a first region of the vapor generator, a second expansion valve positioned upstream of the first heat exchanger, a third expansion valve positioned upstream of the third heat exchanger, wherein the third three-way valve enables a bypassing of the third heat exchanger while maintaining use of the third expansion valve, and a fourth expansion valve positioned immediately upstream of the fourth heat exchanger; and
- a coolant loop that includes a second region of the second heat exchanger, a pump, a fifth heat exchanger, a reservoir, and a coolant network of conduits that fluidly couples components of the coolant loop.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
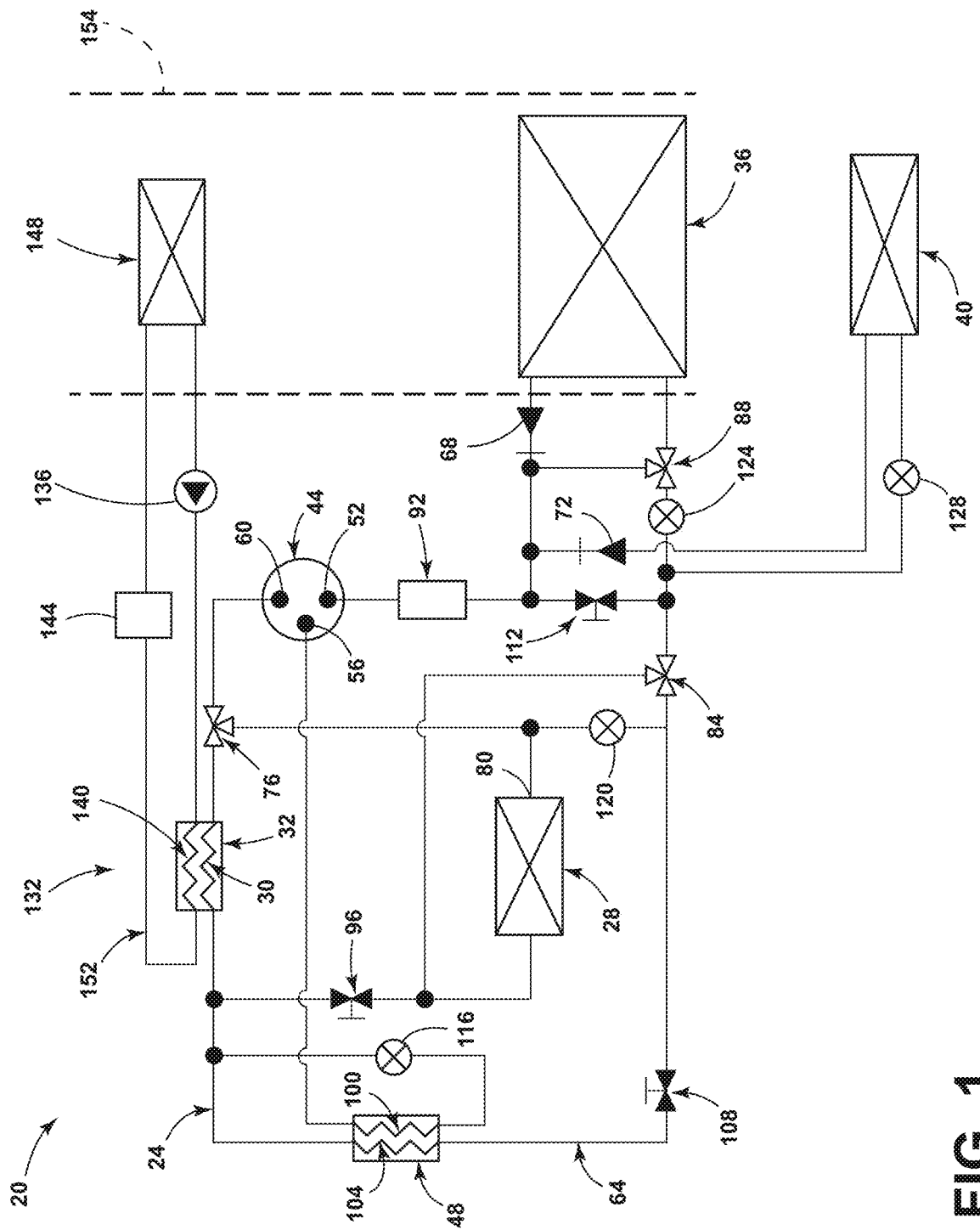
FIG. 1 is a schematic representation of a heat pump arrangement, illustrating a refrigerant loop and a coolant loop, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heat pump. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-12, reference numeral 20 generally designates a heat pump. The heat pump 20 includes a refrigerant loop 24. The refrigerant loop 24 includes a first heat exchanger 28, a first region 30 of a second heat exchanger 32, a third heat exchanger 36, a fourth heat exchanger 40, a compressor 44, and a vapor generator 48. The compressor 44 includes a low-pressure inlet 52, a mid-pressure inlet 56, and an outlet 60. The vapor generator 48 is positioned downstream of the outlet 60 of the compressor 44 and upstream of both the low-pressure inlet 52 and the mid-pressure inlet 56. A refrigerant network of conduits 64 fluidly couples the various components of the refrigerant loop 24. A first heat exchange fluid is circulated through the refrigerant network of conduits 64. The refrigerant network of conduits 64 is fluidly coupled with various components of the refrigerant loop 24 that will be discussed herein. For the sake of brevity and clarity, individual sections of the refrigerant network of conduits 64 will not be discussed unless additional clarity is provided by such discussion. Rather, the flow of the first heat exchange fluid will be described with regard to the interaction between the first heat exchange fluid and the various components of the refrigerant loop 24. The refrigerant loop 24 also includes a first check valve 68 and a second check valve 72. The first check valve 68 is positioned immediately downstream of the third heat exchanger 36. The second check valve 72 is positioned immediately downstream of the fourth heat exchanger 40.

Referring again to FIGS. 1-12, a first three-way valve 76 is positioned downstream of the outlet 60 of the compressor 44 and upstream of an inlet 80 of the first heat exchanger 28. Additionally, the first three-way valve 76 is positioned upstream of the first region 30 of the second heat exchanger 32. A second three-way valve 84 is positioned immediately downstream of the first heat exchanger 28. A third three-way valve 88 is positioned immediately upstream of the third heat exchanger 36. In various examples, an accumulator 92 is positioned immediately upstream of the low-pressure inlet of the compressor 44. The accumulator 92 may be a suction accumulator. In general, the accumulator 92 can protect the compressor 44 from liquid slugging or liquid being introduced into the compressor 44. The accumulator 92 can also retain moisture and contaminants from the refrigerant loop 24 and ensure that only refrigerant, such as the first heat exchange fluid, is returning to the compressor 44. It is contemplated that a receiver-dryer may be used in place of the accumulator 92 or in addition to the accumulator 92. In examples that employ the receiver-dryer, the receiver-dryer can be positioned along the refrigerant loop 24 (e.g., along the refrigerant network of conduits 64). When employed, the receiver-dryer can act as a temporary storage container for the first heat exchange fluid during low system demands when operating the heat pump 20. Additionally, the receiver-dryer can contain a desiccant that is used to absorb moisture (e.g., water) that may have entered the first heat exchange fluid. In some examples, the receiver-dryer may include a filter that can trap debris that may have entered into the refrigerant loop 24 and/or the first heat exchange fluid. A first shutoff valve 96 is plumbed in series with the first heat exchanger 28 and is positioned downstream of the first heat exchanger 28. The vapor generator 48 includes a first region 100 and a second region 104. A second shutoff valve 108 is plumbed in series with the second region 104 of the vapor generator 48. The second shutoff valve 108 is positioned downstream of the second region 104. A third shutoff valve 112 is positioned downstream of the second three-way valve 84. For example, the third shutoff valve 112 may be positioned immediately downstream of the second three-way valve 84.

Referring further to FIGS. 1-12, a first expansion valve 116 is positioned upstream of the vapor generator 48. In some examples, the vapor generator 48 is a liquid-gas separator valve. In such examples, the liquid-gas separator valve may perform a thermal phase separation and/or a mechanical phase separation, whereby a gaseous component of the first heat exchange fluid that is circulating through the refrigerant loop 24 is extracted, at least in part. The portion of the gaseous component of the first heat exchange fluid extracted by the liquid-gas separator valve may then be injected into the compressor at the mid-pressure inlet 56. Additionally, in such examples, the remainder of the first heat exchange fluid, which may contain liquid and gas components, is circulated through the refrigerant network of conduits 64 to remaining components of the refrigerant loop 24 for a given mode of operation. This remaining portion of the first heat exchange fluid eventually is directed to the low-pressure inlet 52 of the compressor 44. In alternative examples, the vapor generator 48 is a plate-style heat exchanger. The first and second regions 100, 104 of the vapor generator 48 can be present in the plate-style heat exchanger examples. In such examples, the first expansion valve 116 can be positioned upstream of the first region 100 of the vapor generator 48. For example, the first expansion valve 116 can be positioned immediately upstream of the first region 100 of the vapor generator 48. A second expansion valve 120 is positioned upstream of the first heat exchanger 28. A third expansion valve 124 is positioned upstream of the third heat exchanger 36. A fourth expansion valve 128 is positioned upstream of the fourth heat exchanger 40.

Referring still further to FIGS. 1-12, the heat pump 20 can further include a coolant loop 132. The coolant loop 132 includes a pump 136, a second region 140 of the second heat exchanger 32, a reservoir 144, a fifth heat exchanger 148, and a coolant network of conduits 152 that fluidly couples components of the coolant loop 132. A second heat exchange fluid flows through the coolant network of conduits 152 of the coolant loop 132, as well as the components of the coolant loop 132. The first and second heat exchange fluids thermally interact by way of the second heat exchanger 32. More specifically, as the first and second heat exchange fluids flow through the first region 30 and the second region 140 of the second heat exchanger 32, respectively, the first and second heat exchange fluids thermally interact. In various examples, the fifth heat exchanger 148 can be in fluid communication with ductwork 154 of a Heating, Ventilation, and Air Conditioning (HVAC) system. Similarly, the third heat exchanger 36 can be in fluid communication with the ductwork 154 of the HVAC system. Accordingly, the third and fifth heat exchangers 36, 148 may be employed to alter a temperature of ambient air and provide temperature-controlled air to an environment (e.g., a cabin of a vehicle).

Referring now to FIGS. 2-11, various modes of operation that employ the vapor generator 48 are depicted in exemplary form. The specifics of the particular modes of operation will be discussed in further detail herein. In the depicted examples, a first branching point 156 is positioned immediately upstream of an inlet 160 of the second region 104 of the vapor generator 48. Similarly, the first branching point 156 is positioned immediately upstream of the first expansion valve 116. The first heat exchange fluid is driven through the refrigerant network of conduits 64 by the compressor 44 along a variety of paths to reach the first branching point 156 based upon the given mode of operation, as will be discussed in further detail herein. Once the first heat exchange fluid reaches the first branching point 156, a portion of the first heat exchange fluid is diverted toward the first expansion valve 116, while the remaining portion of the first heat exchange fluid continues toward the second region 104 of the vapor generator 48. In various examples, the portion of the first heat exchange fluid that is diverted toward the first expansion valve 116 can be expressed as a ratio or percentage. For example, expressing the ratio as a percentage of the first heat exchange fluid that is diverted toward the first expansion valve 116, the first expansion valve 116 can receive about 5%, about 10%, about 15%, about 20%, about 25%, about 30%, about 35%, about 40%, about 45%, about 50%, about 55%, or about 60% of the first heat exchange fluid that encounters the first branching point 156. The remainder, or balancing percentage, of the first heat exchange fluid that encounters the first branching point 156 and is not diverted toward the first expansion valve 116 can continue toward the second region 104 of the vapor generator 48. It is contemplated that in different modes of operation of the heat pump 20, the percentage of the first heat exchange fluid that is received by the first expansion valve 116 may vary. The portion of the first heat exchange fluid that is diverted toward the first expansion valve 116 flows through the first expansion valve 116 and is directed toward an inlet 164 of the first region 100 of the vapor generator 48. This diverted portion of the first heat exchange fluid flows through the first region 100 and exits the vapor generator 48 at an outlet 168 of the vapor generator 48. The portion of the first heat exchange fluid that was diverted toward the first expansion valve 116 decreases in pressure and temperature as a result of interaction with the first expansion valve 116. Accordingly, the first heat exchange fluid flowing through the first region 100 of the vapor generator 48 has a lower pressure and temperature than the first heat exchange fluid flowing through the second region 104. Therefore, the first heat exchange fluid within the first region 100 thermally interacts with the first heat exchange fluid flowing through the second region 104 of the vapor generator 48.

Referring again to FIGS. 2-11, as a result of the thermal interaction between the first heat exchange fluid within the first region 100 and the first heat exchange fluid within the second region 104, the first heat exchange fluid within the first region 100 exits the vapor generator 48 at the outlet 168 of the first region 100 at a higher temperature, pressure, and/or vapor percentage than the first heat exchange fluid that entered the inlet 164 of the first region 100. The first heat exchange fluid that exits the first region 100 by way of the outlet 168 is directed toward the mid-pressure inlet 56 of the compressor 44. The first heat exchange fluid from the first region 100 of the vapor generator 48 is injected into the compressor 44. The injection of the first heat exchange fluid at the mid-pressure inlet 56 of the compressor 44 can improve efficiency of the refrigerant loop 24 and/or increase a heat exchange capacity of the refrigerant loop 24. For example, the injection the first heat exchange fluid at the mid-pressure inlet 56 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 56 can increase an ambient temperature operating range of the heat pump 20 and/or the refrigerant loop 24.

Referring further to FIGS. 2-11, the portion of the first heat exchange fluid that was not diverted toward the first expansion valve 116 and instead flowed toward the inlet 160 of the second region 104 of the vapor generator 48 thermally interacts with the first heat exchange fluid that was diverted toward the first expansion valve 116. During this thermal interaction between the first heat exchange fluid within the second region 104 and the first exchange fluid within the first region 100, heat is transferred from the first heat exchange fluid within the second region 104 to the first heat exchange fluid within the first region 100. Accordingly, the first heat exchange fluid exiting the vapor generator 48 at an outlet 172 of the second region 104 may be at a different temperature, pressure, and/or vapor percentage than the first heat exchange fluid that entered the inlet 160. For example, the first heat exchange fluid that exits the vapor generator 48 at the outlet 172 of the second region 104 may have a lower temperature and pressure than when the first heat exchange fluid entered the inlet 160 of the second region 104. Upon exiting the outlet 172 of the second region 104, the first heat exchange fluid is directed toward the second shutoff valve 108. The first heat exchange fluid flows through the second shutoff valve 108 as a result of the second shutoff valve 108 being in an open position.

Figure 2:
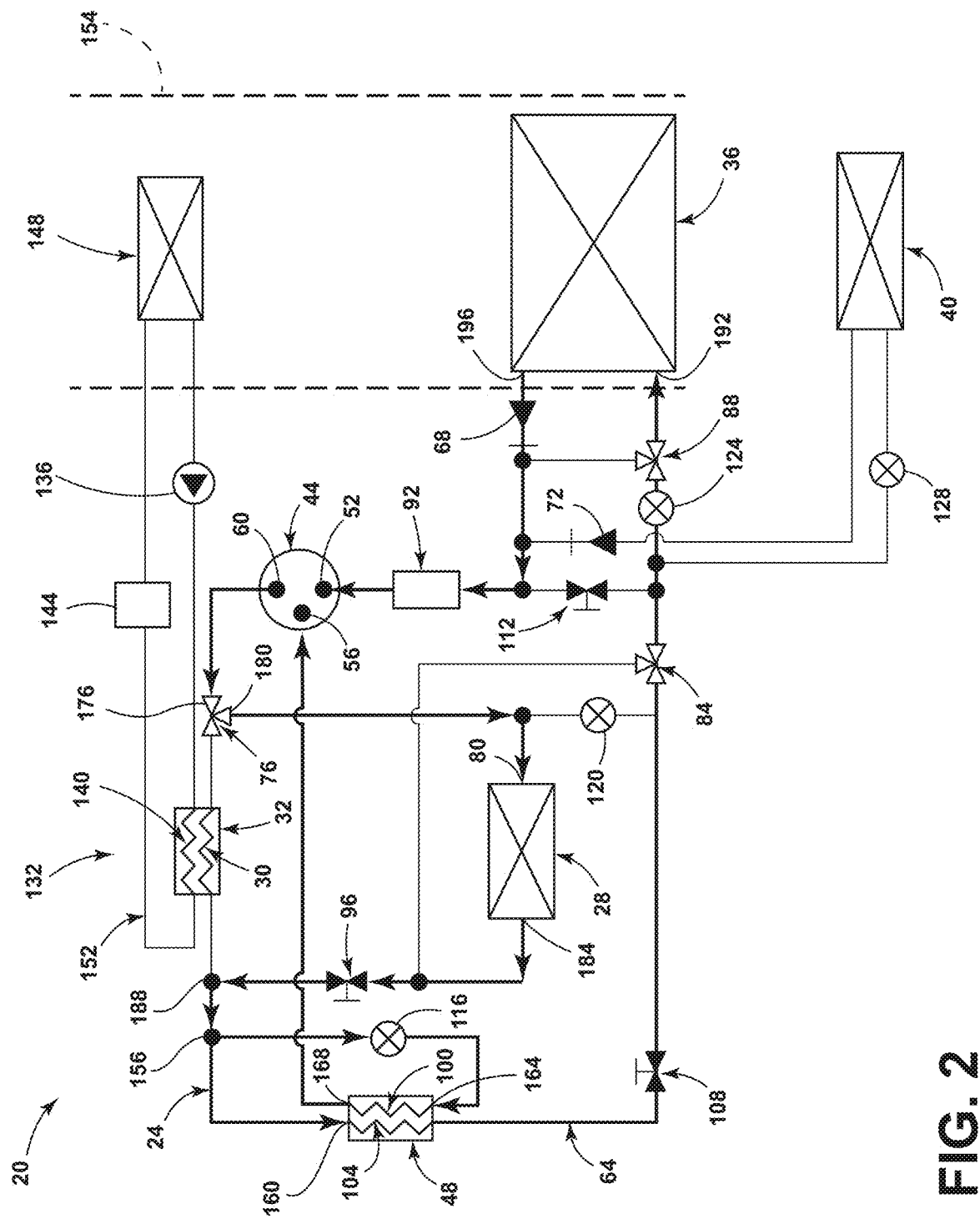
FIG. 2 is a schematic representation of the heat pump arrangement, illustrating a cabin cooling mode of operation, according to one example.
Figure 3:
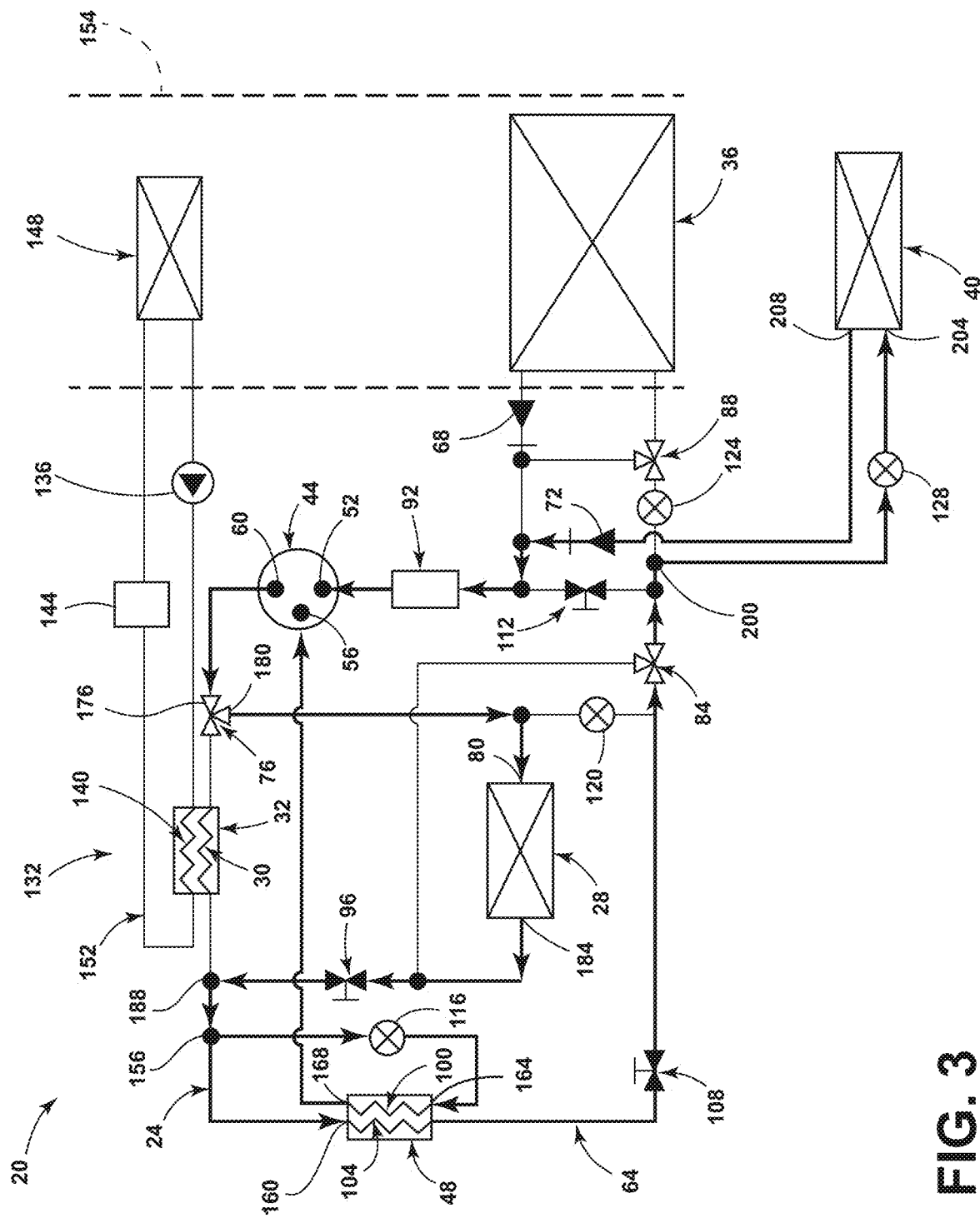
FIG. 3 is a schematic representation of the heat pump arrangement, illustrating a battery cooling mode of operation, according to one example.
Figure 4:
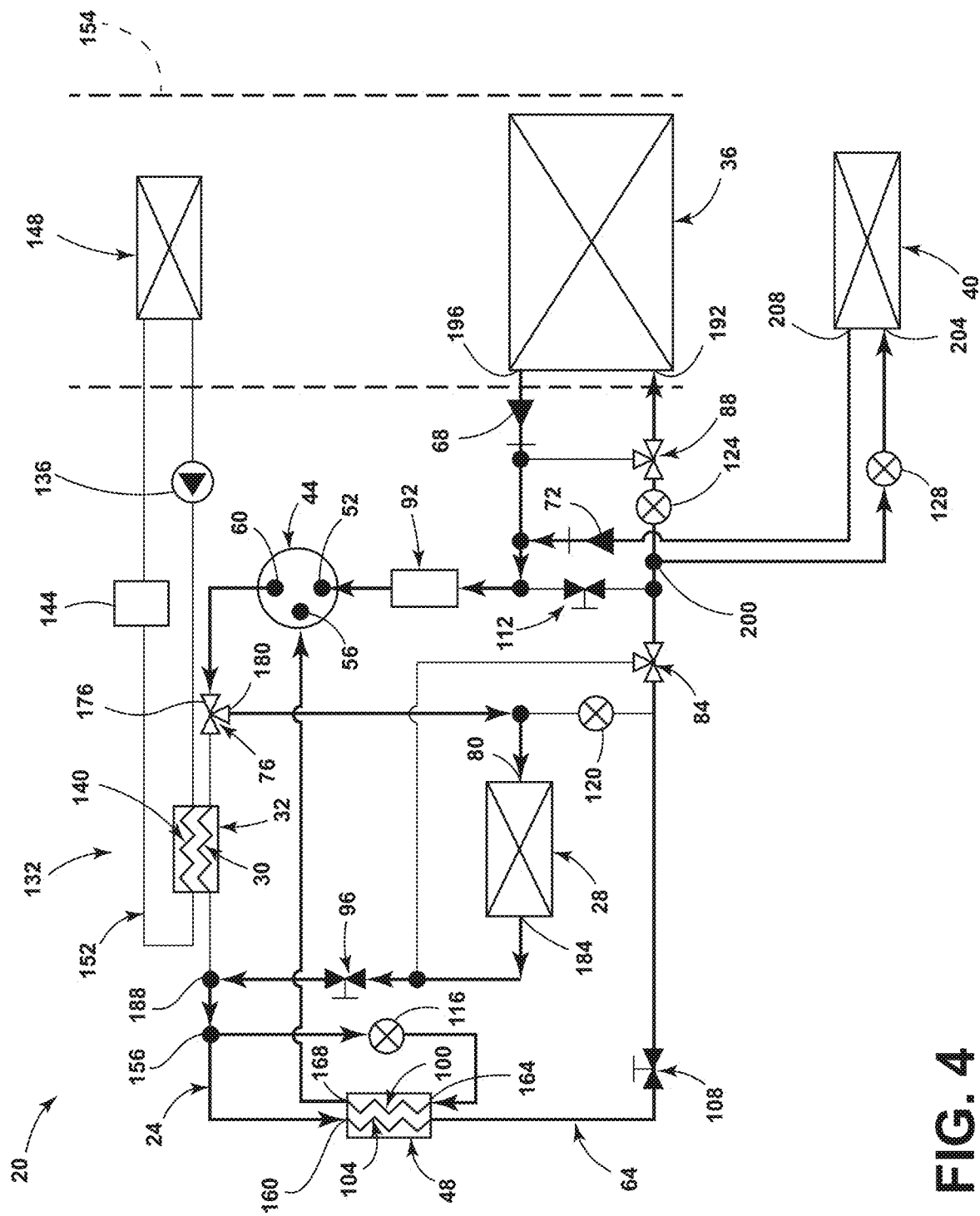
FIG. 4 is a schematic representation of the heat pump arrangement, illustrating a cabin and battery cooling mode of operation, according to one example.

Referring to FIGS. 2-4, a cabin cooling mode of operation (FIG. 2), a battery cooling mode of operation (FIG. 3), and a cabin and battery cooling mode of operation (FIG. 4) are each depicted in exemplary form. In each of these modes of operation, the compressor 44 acts upon the first heat exchange fluid to drive the first heat exchange fluid from the outlet 60 toward the first three-way valve 76. More specifically, the compressor 44 drives the first heat exchange fluid toward a first port 176 of the first three-way valve 76. As a result of the positioning of the first three-way valve 76 in these modes of operation, the first heat exchange fluid that is received at the first port 176 is directed to exit the first three-way valve 76 at a second port 180 thereof. After exiting the second port 180 of the first three-way valve 76, the first heat exchange fluid is directed toward the inlet 80 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be removed from the first heat exchange fluid. The first heat exchange fluid exits the first heat exchanger 28 at an outlet 184 of the first heat exchanger 28. Upon exiting the first heat exchanger 28 by way of the outlet 184, the first heat exchange fluid is directed toward the first shutoff valve 96. In each of these modes of operation, the first shutoff valve 96 is in an open position. After flowing through the first shutoff valve 96, the first heat exchange fluid passes through a first coupling point 188 that is downstream of the first region 30 of the second heat exchanger 32 and upstream of the first branching point 156. From the first coupling point 188, the first heat exchange fluid is directed to the first branching point 156. At the first branching point 156, the first heat exchange fluid is diverted in the manner already described with regard to the first expansion valve 116 and the vapor generator 48.

With specific reference to FIG. 2, as the flow of the first heat exchange fluid from the compressor 44 to the second shutoff valve 108 has been described above, such description here is omitted for brevity. From the second shutoff valve 108, the first heat exchange fluid is directed toward the second three-way valve 84. The positioning of the second three-way valve 84 in this mode of operation is such that the first heat exchange fluid received by the second three-way valve 84 is entirely directed toward the third expansion valve 124 by the refrigerant network of conduits 64. As with the first expansion valve 116, the first heat exchange fluid experiences a decrease in pressure and temperature as a result of interaction with the third expansion valve 124. After exiting the third expansion valve 124, the first heat exchange fluid is directed toward the third three-way valve 88. The positioning of the third three-way valve 88 in this mode of operation is such that the first heat exchange fluid received by the third three-way valve 88 is entirely directed toward an inlet 192 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of an outlet 196 of the third heat exchanger 36 may have an increased pressure, temperature, and/or vapor percentage than the first heat exchange fluid that entered the third heat exchanger 36 at the inlet 192. Upon exiting the third heat exchanger 36 by way of the outlet 196, the first heat exchange fluid flows through the first check valve 68. The second check valve 72 prevents back flow toward the fourth heat exchanger 40 in this mode of operation. Accordingly, the fourth heat exchanger 40 is prevented from becoming a storage vessel for the first heat exchange fluid when the fourth heat exchanger 40 is not employed in a given mode of operation. After exiting the first check valve 68, the first heat exchange fluid is directed toward the accumulator 92 by the refrigerant network of conduits 64. The accumulator 92 receives the first heat exchange fluid and provides a gaseous component of the first heat exchange fluid to the low-pressure inlet 52 of the compressor 44, thereby completing the traversal of the refrigerant loop 24 in the cabin cooling mode of operation.

Referring particularly to FIG. 3, as the flow of the first heat exchange fluid from the compressor 44 to the second shutoff valve 108 has been described above, such description is omitted here for brevity. From the second shutoff valve 108, the first heat exchange fluid is directed toward the second three-way valve 84. The positioning of the second three-way valve 84 in this mode of operation is such that the first heat exchange fluid received by the second three-way valve 84 is entirely directed toward the fourth expansion valve 128. More specifically, downstream of the second three-way valve 84, the first heat exchange fluid encounters a second branching point 200 where, as a result of the positioning of the third three-way valve 88 or the third expansion valve 124 operating as a shutoff valve, the first heat exchange fluid is diverted toward the fourth expansion valve 128 and is prevented from flowing to the third heat exchanger 36. The first heat exchange fluid experiences a decrease in pressure and temperature as a result of interaction with the fourth expansion valve 128. After exiting the fourth expansion valve 128, the first heat exchange fluid is directed toward an inlet 204 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of an outlet 208 of the fourth heat exchanger 40 may have an increased pressure, temperature, and/or vapor percentage than the first heat exchange fluid that entered the fourth heat exchanger 40 at the inlet 204. Upon exiting the fourth heat exchanger 40 by way of the outlet 208, the first heat exchange fluid is directed toward the second check valve 72 by the refrigerant network of conduits 64. The first check valve 68 prevents back flow toward the third heat exchanger 36 in this mode of operation. Accordingly, the third heat exchanger 36 is prevented from becoming a storage vessel for the first heat exchange fluid when the third heat exchanger 36 is not employed in a given mode of operation. Once the first heat exchange fluid passes through the second check valve 72, the first heat exchange fluid is directed toward the accumulator 92. The accumulator 92 receives the first heat exchange fluid and provides a gaseous component of the first heat exchange fluid to the low-pressure inlet 52 of the compressor 44, thereby completing the traversal of the refrigerant loop 24 in the battery cooling mode of operation.

With particular reference to FIG. 4, the cabin and battery cooling mode of operation is depicted according to one example. From the second shutoff valve 108, the first heat exchange fluid is directed toward the second three-way valve 84. The positioning of the second three-way valve 84 in this mode of operation is such that the first heat exchange fluid received by the second three-way valve 84 is entirely directed toward the second branching point 200. At the second branching point 200, a first portion of the first heat exchange fluid is directed toward the fourth expansion valve 128 and a second portion of the first heat exchange fluid is directed toward the third expansion valve 124. The first portion of the first heat exchange fluid experiences a decrease in pressure and temperature as a result of interaction with the fourth expansion valve 128. Similarly, the second portion of the first heat exchange fluid experiences a decrease in pressure and temperature as a result of the interaction with the third expansion valve 124. After exiting the third expansion valve 124, the first heat exchange fluid is directed toward the third three-way valve 88. The positioning of the third three-way valve 88 in this mode of operation is such that the first heat exchange fluid received by the third three-way valve 88 is entirely directed toward the inlet 192 of the third heat exchanger 36. The decreased temperature and pressure of the first heat exchange fluid flowing through the third heat exchanger 36 can be employed to provide cooling to air that is flowing through the ductwork 154 with which the third heat exchanger 36 is in fluid communication. Accordingly, the first heat exchange fluid that exits the third heat exchanger 36 by way of the outlet 196 of the third heat exchanger 36 may have an increased pressure, temperature, and/or vapor percentage than the first heat exchange fluid that entered the third heat exchanger 36 at the inlet 192. Upon exiting the third heat exchanger 36 by way of the outlet 196, the first heat exchange fluid is directed toward the first check valve 68.

Referring again to FIG. 4, after exiting the fourth expansion valve 128, the first heat exchange fluid is directed toward the inlet 204 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 208 of the fourth heat exchanger 40 may have an increased pressure, temperature, and/or vapor percentage than the first heat exchange fluid that entered the fourth heat exchanger 40 at the inlet 204. Upon exiting the fourth heat exchanger 40 by way of the outlet 208, the first heat exchange fluid is directed toward the second check valve 72 by the refrigerant network of conduits 64. Once the first heat exchange fluid has passed through the first and second check valves 68, 72, the first portion of the first heat exchange fluid that was directed toward the fourth heat exchanger 40 is rejoined or recombined with the second portion of the first heat exchange fluid that was directed toward the third heat exchanger 36. From the first and second check valves 68, 72, the first heat exchange fluid is directed toward the accumulator 92. The accumulator 92 receives the first heat exchange fluid and provides a gaseous component of the first heat exchange fluid to the low-pressure inlet 52 of the compressor 44, thereby completing the traversal of the refrigerant loop 24 in the cabin and battery cooling mode of operation.

Referring now to FIGS. 5-9, various modes of operation of the heat pump 20 that employ the coolant loop 132 are depicted. The pump 136 is activated in these modes of operation such that a second heat exchange fluid is circulated through the components of the coolant loop 132. The second heat exchange fluid is driven from the pump 136 toward the second heat exchanger 32. Accordingly, the second heat exchange fluid thermally interacts with the first heat exchange fluid by way of the second heat exchanger 32. More specifically, the second heat exchange fluid is circulated through the second region 140 of the second heat exchanger 32 while the first heat exchange fluid is circulated through the first region 30 of the second heat exchanger 32. In various examples, the second heat exchange fluid may extract heat from the first heat exchange fluid at the second heat exchanger 32. From the second heat exchanger 32, the second heat exchange fluid is directed to an inlet 212 of the reservoir 144 by the coolant network of conduits 152. The reservoir 144 can accumulate the second heat exchange fluid. An outlet 216 of the reservoir 144 is plumbed to an inlet 220 of the fifth heat exchanger 148 by the coolant network of conduits 152. An outlet 224 of the fifth heat exchanger 148 is plumbed to the pump 136. Accordingly, as the pump 136 is operated, the second heat exchange fluid is pulled from the reservoir 144 and into the inlet 220 of the fifth heat exchanger 148 in a siphon-like manner. Said another way, operation of the pump 136 may generate a pressure differential across the reservoir 144, with a greater pressure being present at the inlet 212 and a lower pressure being present at the outlet 216. The pressure differential across the reservoir 144 can facilitate the introduction of the second heat exchange fluid into the inlet 220 of the fifth heat exchanger 148. The second heat exchange fluid can provide heat to a cabin of a vehicle as a result of the fluid communication between the fifth heat exchanger 148 and the ductwork 154. For example, the fifth heat exchanger 148 may operate as a heater core. Alternatively, heat from the second heat exchange fluid may be transferred from the fifth heat exchanger 148 to components that can benefit from such heat, such as batteries or electrical components during cold weather conditions in the environment within which the vehicle or the heat pump 20 currently occupies at a given time.

Figure 5:
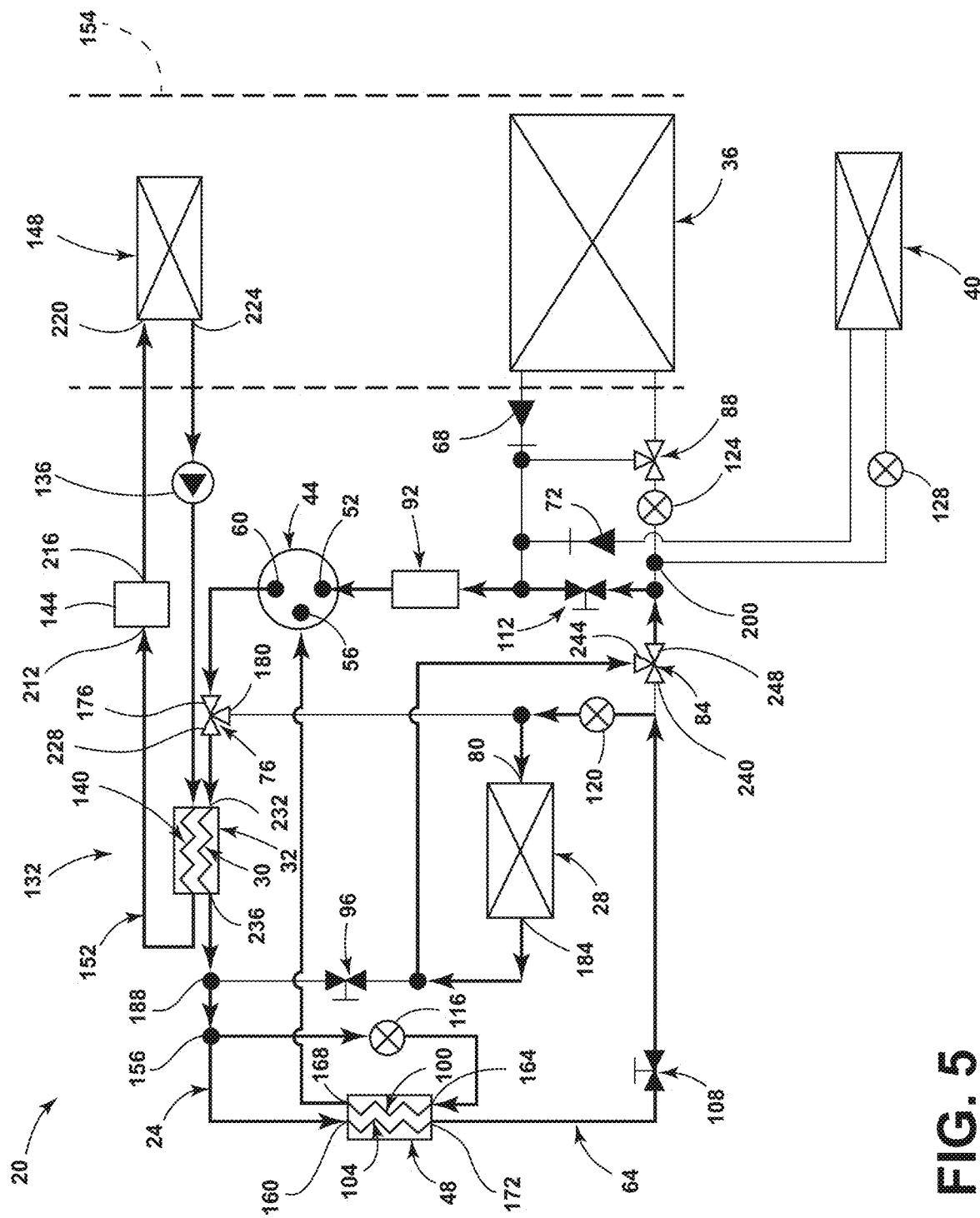
FIG. 5 is a schematic representation of the heat pump arrangement, illustrating a heating mode of operation, according to one example.
Figure 6:
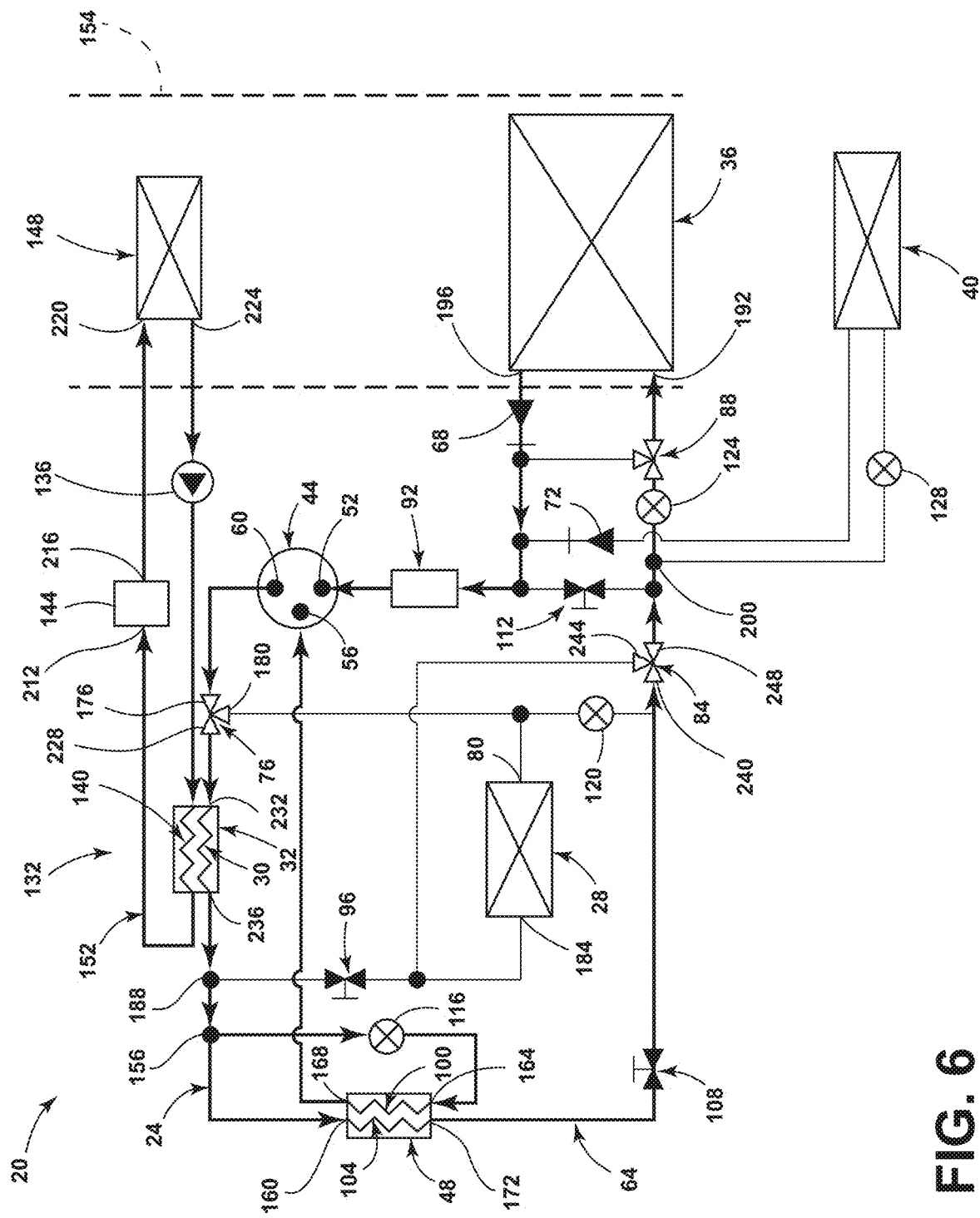
FIG. 6 is a schematic representation of the heat pump arrangement, illustrating a first reheat mode of operation, according to one example.
Figure 7:
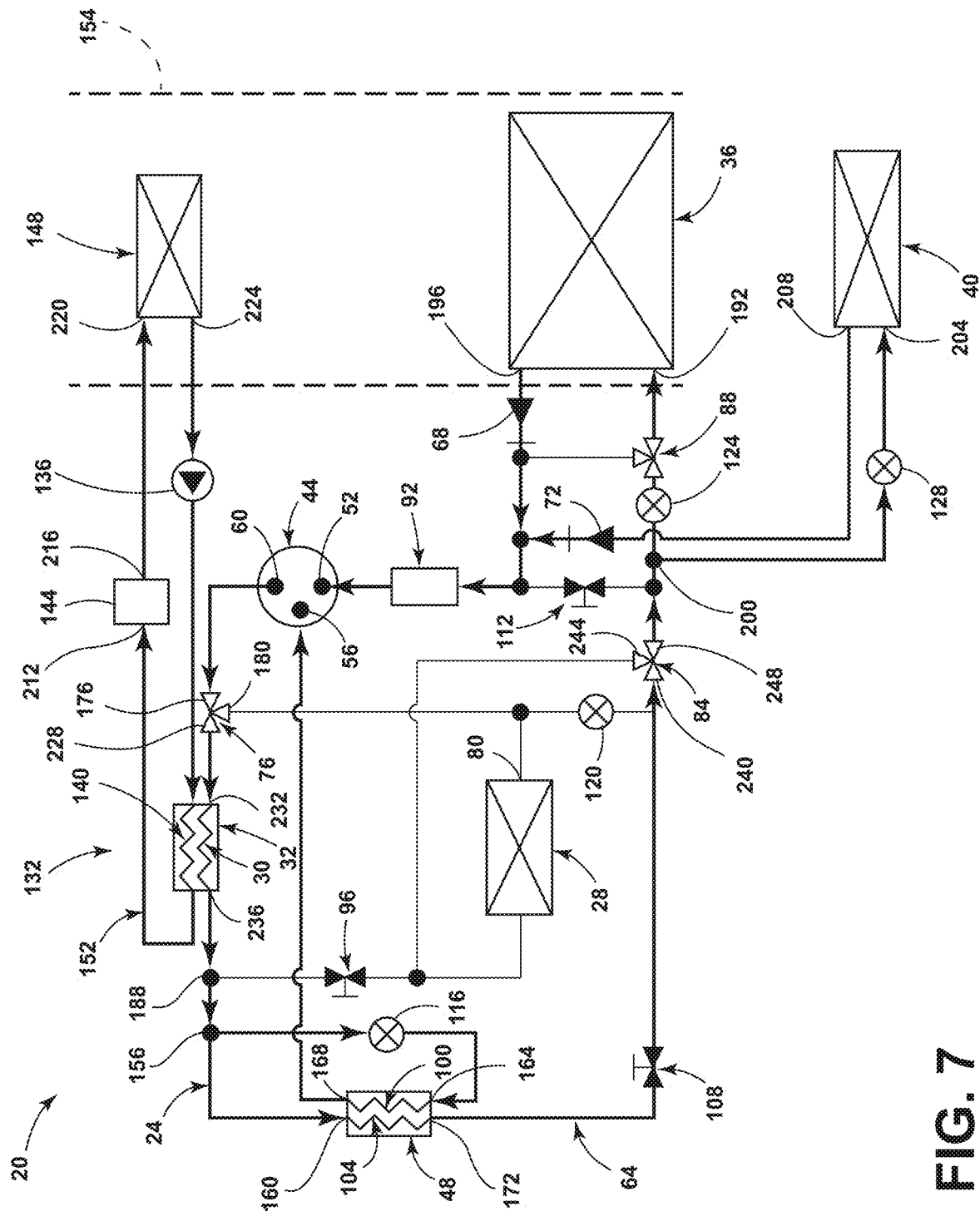
FIG. 7 is a schematic representation of the heat pump arrangement, illustrating a second reheat mode of operation, according to one example.
Figure 8:
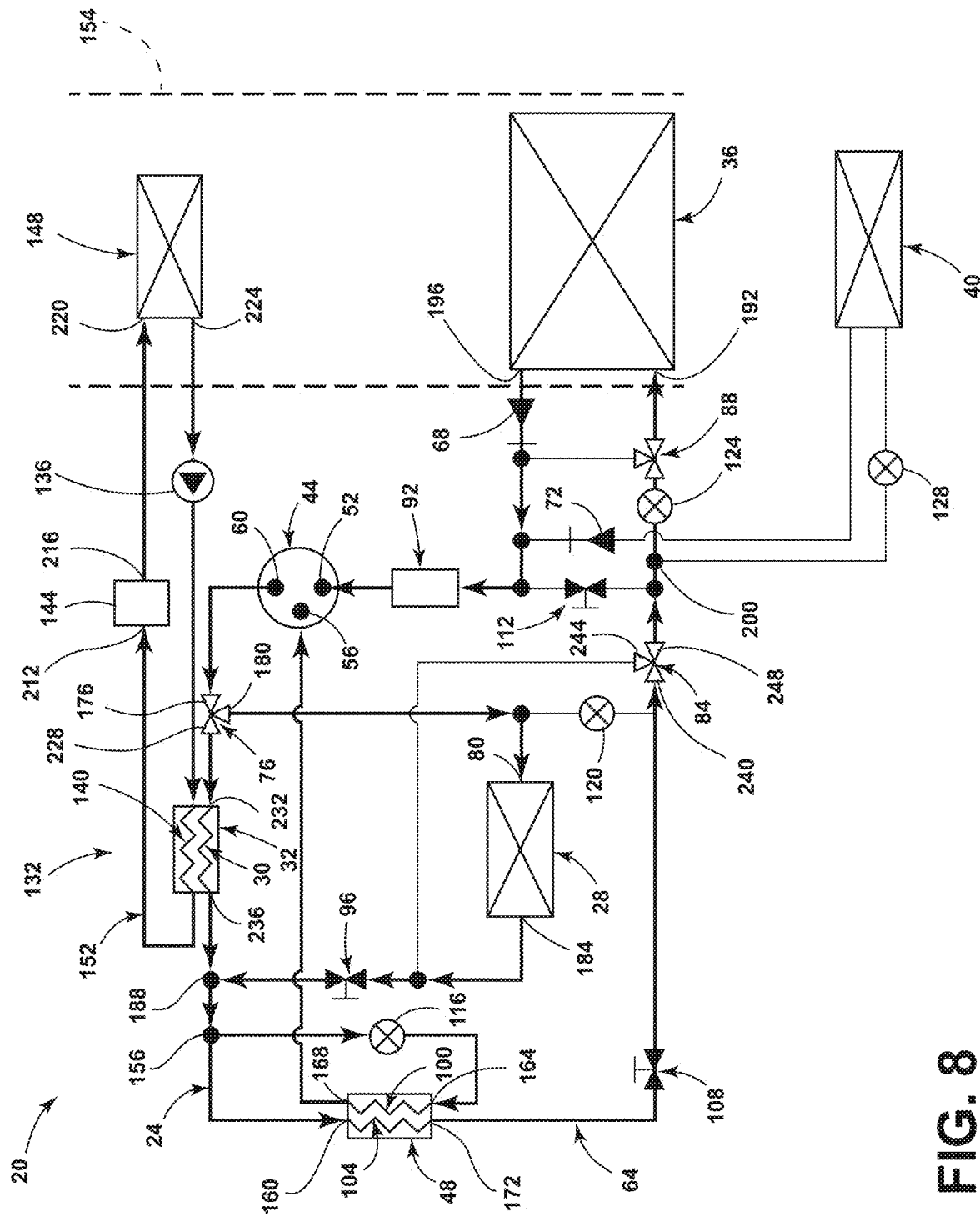
FIG. 8 is a schematic representation of the heat pump arrangement, illustrating a third reheat mode of operation, according to one example.
Figure 9:
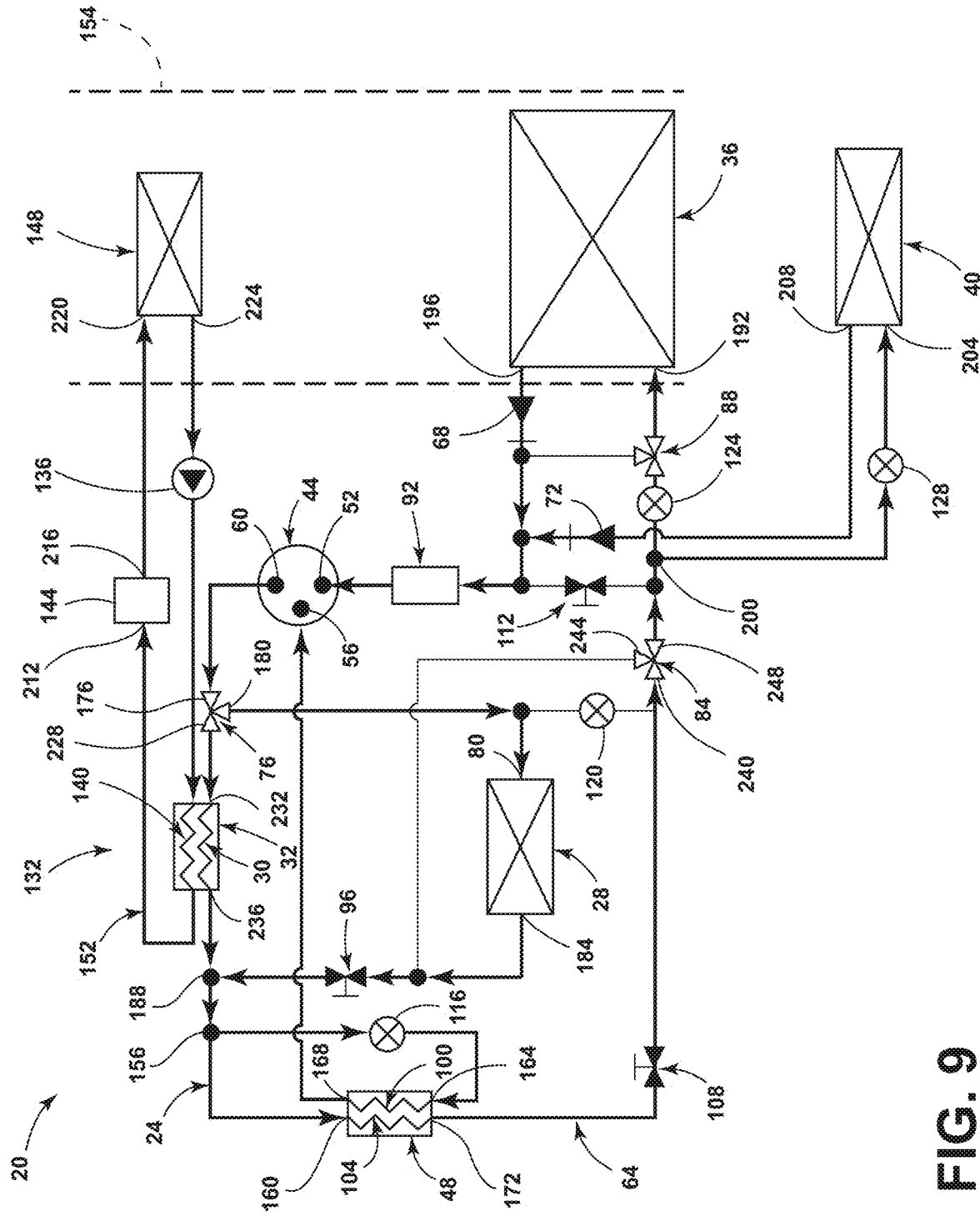
FIG. 9 is a schematic representation of the heat pump arrangement, illustrating a fourth reheat mode of operation, according to one example.

Referring again to FIGS. 5-9, the compressor 44 acts upon the first heat exchange fluid to drive the first heat exchange fluid from the outlet 60 of the compressor 44 toward the first port 176 of the first three-way valve 76. The positioning of the first three-way valve 76 in the modes of operation depicted in FIGS. 5-7 is such that an entirety of the first heat exchange fluid that is received at the first port 176 is directed out of a third port 228 of the first three-way valve 72. The positioning of the first three-way valve 76 in the modes of operation depicted in FIGS. 8 and 9 is such that a first portion of the first heat exchange fluid that is received at the first port 176 is directed out of the second port 180 and a second portion of the first heat exchange fluid that is received at the first port 176 is directed out of the third port 228, as will be discussed in further detail herein. In each of the modes of operation depicted in FIGS. 5-9, from the third port 228 of the first three-way valve 76, the first heat exchange fluid is directed toward an inlet 232 of the first region 30 of the second heat exchanger 32. After thermally interacting with the second heat exchange fluid in the second heat exchanger 32, the first heat exchange fluid exits the first region 30 of the second heat exchanger 32 by way of an outlet 236 of the first region 30. Upon exiting the first region 30 of the second heat exchanger 32, the first heat exchange fluid is directed toward the first coupling point 188. At the first coupling point 188, the first heat exchange fluid is prevented from flowing toward the first shutoff valve 96 by the first shutoff valve 96 being in a closed position (FIGS. 5-7) or by a pressure of the first heat exchange fluid flowing from the first shutoff valve 96 (FIGS. 8 and 9). From the first coupling point 188, the first heat exchange fluid is directed toward the first branching point 156.

Referring further to FIGS. 5-9, as the first heat exchange fluid encounters the first branching point 156, a portion of the first heat exchange fluid is diverted toward the first expansion valve 116, while the remaining portion of the first heat exchange fluid continues toward the second region 104 of the vapor generator 48. In various examples, the portion of the first heat exchange fluid that is diverted toward the first expansion valve 116 can be expressed as a ratio or percentage. For example, expressing the ratio as a percentage of the first heat exchange fluid that is diverted toward the first expansion valve 116, the first expansion valve 116 can receive about 5%, about 10%, about 15%, about 20%, about 25%, about 30%, about 35%, about 40%, about 45%, about 50%, about 55%, or about 60% of the first heat exchange fluid that encounters the first branching point 156. The remainder, or balancing percentage, of the first heat exchange fluid that encounters the first branching point 156 and is not diverted toward the first expansion valve 116 can continue toward the second region 104 of the vapor generator 48. It is contemplated that in different modes of operation of the heat pump 20, the percentage of the first heat exchange fluid that is received by the first expansion valve 116 may vary. It is further contemplated that the first expansion valve 116 may operate as a shutoff valve in some modes of operation such that an entirety of the first heat exchange fluid that encounters the first branching point 156 is directed toward the second region 104 of the vapor generator 48, effectively bypassing the generation of vapor for injection at the mid-pressure inlet 56.

Referring still further to FIGS. 5-9, the portion of the first heat exchange fluid that is diverted toward the first expansion valve 116 flows through the first expansion valve 116 and is directed toward the inlet 164 of the first region 100 of the vapor generator 48. This diverted portion of the first heat exchange fluid flows through the first region 100 and exits the vapor generator 48 at the outlet 168 of the first region 100 of the vapor generator 48. The portion of the first heat exchange fluid that was diverted toward the first expansion valve 116 decreases in pressure and temperature as a result of interaction with the first expansion valve 116. Accordingly, the first heat exchange fluid flowing through the first region 100 of the vapor generator 48 has a lower pressure and temperature than the first heat exchange fluid flowing through the second region 104. Therefore, the first heat exchange fluid within the first region 100 thermally interacts with the first heat exchange fluid flowing through the second region 104 of the vapor generator 48.

Referring yet again to FIGS. 5-9, as a result of the thermal interaction between the first heat exchange fluid within the first region 100 and the first heat exchange fluid within the second region 104, the first heat exchange fluid within the first region 100 exits the vapor generator 48 at the outlet 168 of the first region 100 at a higher temperature, pressure, and/or vapor percentage than the first heat exchange fluid that entered the inlet 164 of the first region 100. The first heat exchange fluid that exits the first region 100 by way of the outlet 168 is directed toward the mid-pressure inlet 56 of the compressor 44. The first heat exchange fluid from the first region 100 of the vapor generator 48 is injected into the compressor 44 in a gaseous state. The injection of the first heat exchange fluid at the mid-pressure inlet 56 of the compressor 44 can improve efficiency of the refrigerant loop 24 and/or increase a heat exchange capacity of the refrigerant loop 24. For example, the injection of the first heat exchange fluid at the mid-pressure inlet 56 of the compressor 44 can increase a condensing capacity of the refrigerant loop 24 while decreasing a load experienced by the compressor 44. The improved condensing capacity of the refrigerant loop 24 and the decreased load on the compressor 44 can contribute to performance and efficiency improvements for the heat pump 20 and/or the refrigerant loop 24. Additionally, the injection of the first heat exchange fluid at the mid-pressure inlet 56 can increase an ambient temperature operating range of the heat pump 20 and/or the refrigerant loop 24.

Referring again to FIGS. 5-9, the portion of the first heat exchange fluid that was not diverted toward the first expansion valve 116 and instead flowed toward the inlet 160 of the second region 104 of the vapor generator 48 thermally interacts with the first heat exchange fluid that was diverted toward the first expansion valve 116. During this thermal interaction between the first heat exchange fluid within the second region 104 and the first exchange fluid within the first region 100, heat is transferred from the first heat exchange fluid within the second region 104 to the first heat exchange fluid within the first region 100. Accordingly, the first heat exchange fluid exiting the vapor generator 48 at the outlet 172 of the second region 104 may be at a different temperature, pressure, and/or vapor percentage than the first heat exchange fluid that entered the inlet 160. For example, the first heat exchange fluid that exits the vapor generator 48 at the outlet 172 of the second region 104 may have a lower temperature and pressure than when the first heat exchange fluid entered the inlet 160 of the second region 104. Upon exiting the outlet 172 of the second region 104, the first heat exchange fluid is directed toward the second shutoff valve 108. The first heat exchange fluid flows through the second shutoff valve 108 as a result of the second shutoff valve 108 being in the open position.

With specific reference to FIG. 5, a heating mode of operation is depicted in exemplary form. From the second shutoff valve 108, the first heat exchange fluid is directed toward a first port 240 of the second three-way valve 84. However, based on the positioning of the second three-way valve 84 in this mode of operation, the first heat exchange fluid is prevented from passing through the second three-way valve 84 by way of the first port 240 thereof. Accordingly, the first heat exchange fluid is directed toward the second expansion valve 120. The first heat exchange fluid experiences a decreases in pressure and temperature as a result of interaction with the second expansion valve 120. In this mode of operation, the first heat exchange fluid is directed toward the inlet 80 of the first heat exchanger 28 upon exiting the second expansion valve 120. Within the first heat exchanger 28, the first heat exchange fluid may absorb heat from fluid with which the first heat exchanger 28 is additionally in contact (e.g., ambient air that is exterior to a vehicle). The first shutoff valve 96 is in a closed position, which results in the first heat exchange fluid being directed toward a second port 244 of the second three-way valve 84 upon exiting the first heat exchanger 28 by way of the outlet 184. As a result of the positioning of the second three-way valve 84, the first heat exchange fluid that is received at the second port 244 is directed out of a third port 248 of the second three-way valve 84. From the third port 248 of the second three-way valve 84, the first heat exchange fluid is directed to the third shutoff valve 112, which is in an open position. After passing through the third shutoff valve 112, the first heat exchange fluid is directed to the accumulator 92, where the accumulator 92 performs as outlined previously. The gaseous component of the first heat exchange fluid is introduced into the compressor 44 from the accumulator 92 by way of the low-pressure inlet 52. The first and second check valves 68, 72 prevent back flow toward the third and fourth heat exchangers 36, 40, respectively, in this mode of operation. Accordingly, the third and fourth heat exchangers 36, 40 are prevented from becoming storage vessels for the first heat exchange fluid when the third and fourth heat exchangers 36, 40 are not employed in a given mode of operation.

Referring to FIGS. 6-9, various modes of operation that employ the third heat exchanger 36 are depicted in exemplary form. More specifically, a first reheat mode of operation (FIG. 6), a second reheat mode of operation (FIG. 7), a third reheat mode of operation (FIG. 8), and a fourth reheat mode of operation (FIG. 9) are depicted. In each of these modes of operation, from the second shutoff valve 108, the first heat exchange fluid is directed toward the first port 240 of the second three-way valve 84. Based upon the positioning of the second three-way valve 84 in these modes of operation, the first heat exchange fluid that is received at the first port 240 is directed to exit the second three-way valve 84 by way of the third port 248. In FIGS. 6 and 8, an entirety of the first heat exchange fluid that exits the third port 248 is directed toward the third expansion valve 124. In FIGS. 7 and 9, a portion of the first heat exchange fluid that exits the third port 248 is diverted toward the fourth expansion valve 128 at the second branching point 200, as will be discussed in further detail herein. The first heat exchange fluid experiences a decrease in pressure and temperature as a result of interaction with the third expansion valve 124. After exiting the third expansion valve 124, the first heat exchange fluid is directed toward the inlet 192 of the third heat exchanger 36 and passes through the third three-way valve 88.

Referring again to FIGS. 6-9, the decreased temperature and pressure of the first heat exchange fluid flowing through the third heat exchanger 36 can be employed to provide cooling to air that is flowing through the ductwork 154 with which the third heat exchanger 36 is in fluid communication such that the air within the ductwork 154 is cooled to below a dew point of the air. Accordingly, the first heat exchange fluid that exits the third heat exchanger 36 by way of the outlet 196 of the third heat exchanger 36 may have an increased pressure, temperature, and/or vapor percentage than the first heat exchange fluid that entered the third heat exchanger 36 at the inlet 192. The cooling of the air within the ductwork 154 that is provided by the third heat exchanger 36 in these modes of operation can be employed as a way of controlling a humidity level within the air circulated through the ductwork 154 (e.g., dehumidification). For example, the cooling of the air within the ductwork 154 that is provided by the third heat exchanger 36 can result in condensing of at least some gaseous components of the air (e.g., water vapor) passing through the ductwork 154. Upon exiting the third heat exchanger 36 by way of the outlet 196, the first heat exchange fluid flows through the first check valve 68. After exiting the first check valve 68, the first heat exchange fluid is directed toward the accumulator 92 by the refrigerant network of conduits 64. The accumulator 92 receives the first heat exchange fluid and provides a gaseous component of the first heat exchange fluid to the low-pressure inlet 52 of the compressor 44. In FIGS. 6 and 8, the second check valve 72 prevents back flow toward the fourth heat exchanger 40. Accordingly, in the modes of operation depicted in FIGS. 6 and 8, the fourth heat exchanger 40 is prevented from becoming a storage vessel for the first heat exchange fluid when the fourth heat exchanger 40 is not employed in a given mode of operation.

Referring specifically to FIGS. 7 and 9, from the third port 248 of the second three-way valve 84, the first heat exchange fluid is directed toward the third expansion valve 124 by the refrigerant network of conduits 64. On the way to the third expansion valve 124, the first heat exchange fluid encounters the second branching point 200. At the second branching point 200, a first portion of the first heat exchange fluid is directed toward the fourth expansion valve 128 and a second portion of the first heat exchange fluid is directed toward the third expansion valve 124. The first portion of the first heat exchange fluid experiences a decrease in pressure and temperature as a result of interaction with the fourth expansion valve 128. The flow of the second portion has already been discussed with regard to these modes of operation and is omitted here for the sake of brevity. After exiting the fourth expansion valve 128, the first heat exchange fluid is directed toward the inlet 204 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 208 of the fourth heat exchanger 40 may have an increased pressure, temperature, and/or vapor percentage than the first heat exchange fluid that entered the fourth heat exchanger 40 at the inlet 204.

Referring again to FIGS. 7 and 9, upon exiting the fourth heat exchanger 40 by way of the outlet 208, the first heat exchange fluid is directed toward the second check valve 72 by the refrigerant network of conduits 64. Once the first heat exchange fluid has passed through the first and second check valves 68, 72, the first portion of the first heat exchange fluid that was directed toward the fourth heat exchanger 40 is rejoined or recombined with the second portion of the first heat exchange fluid that was directed toward the third heat exchanger 36. From the first and second check valves 68, 72, the first heat exchange fluid is directed toward the accumulator 92. The accumulator 92 receives the first heat exchange fluid and provides the gaseous component of the first heat exchange fluid to the low-pressure inlet 52 of the compressor 44.

Referring now to FIGS. 8 and 9, as mentioned above, the positioning of the first three-way valve 76 in these modes of operation is such that the first portion of the first heat exchange fluid that is received at the first port 176 is directed out of the second port 180 and the second portion of the first heat exchange fluid that is received at the first port 176 is directed out of the third port 228. As the flow of the first heat exchange fluid from the third port 228 has already been discussed, focus is now turned to the flow of the first heat exchange fluid from the second port 180. After exiting the second port 180 of the first three-way valve 76, the first heat exchange fluid is directed toward the inlet 80 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be exchanged with the first heat exchange fluid (e.g., heat absorbed by the first heat exchange fluid or heat dissipated from the first heat exchange fluid). The first heat exchange fluid exits the first heat exchanger 28 at the outlet 184 of the first heat exchanger 28. Upon exiting the first heat exchanger 28 by way of the outlet 184, the first heat exchange fluid is directed toward the first shutoff valve 96. In each of these modes of operation, the first shutoff valve 96 is in the open position. After flowing through the first shutoff valve 96, the first heat exchange fluid passes through the first coupling point 188 that is downstream of the first region 30 of the second heat exchanger 32 and upstream of the first branching point 156. At the first coupling point 188, the first and second portions of the first heat exchange fluid are recombined with one another. From the first coupling point 188, the first heat exchange fluid is directed to the first branching point 156. At the first branching point 156, the first heat exchange fluid is diverted in the manner already described with regard to the first expansion valve 116 and the vapor generator 48.

Figure 10:
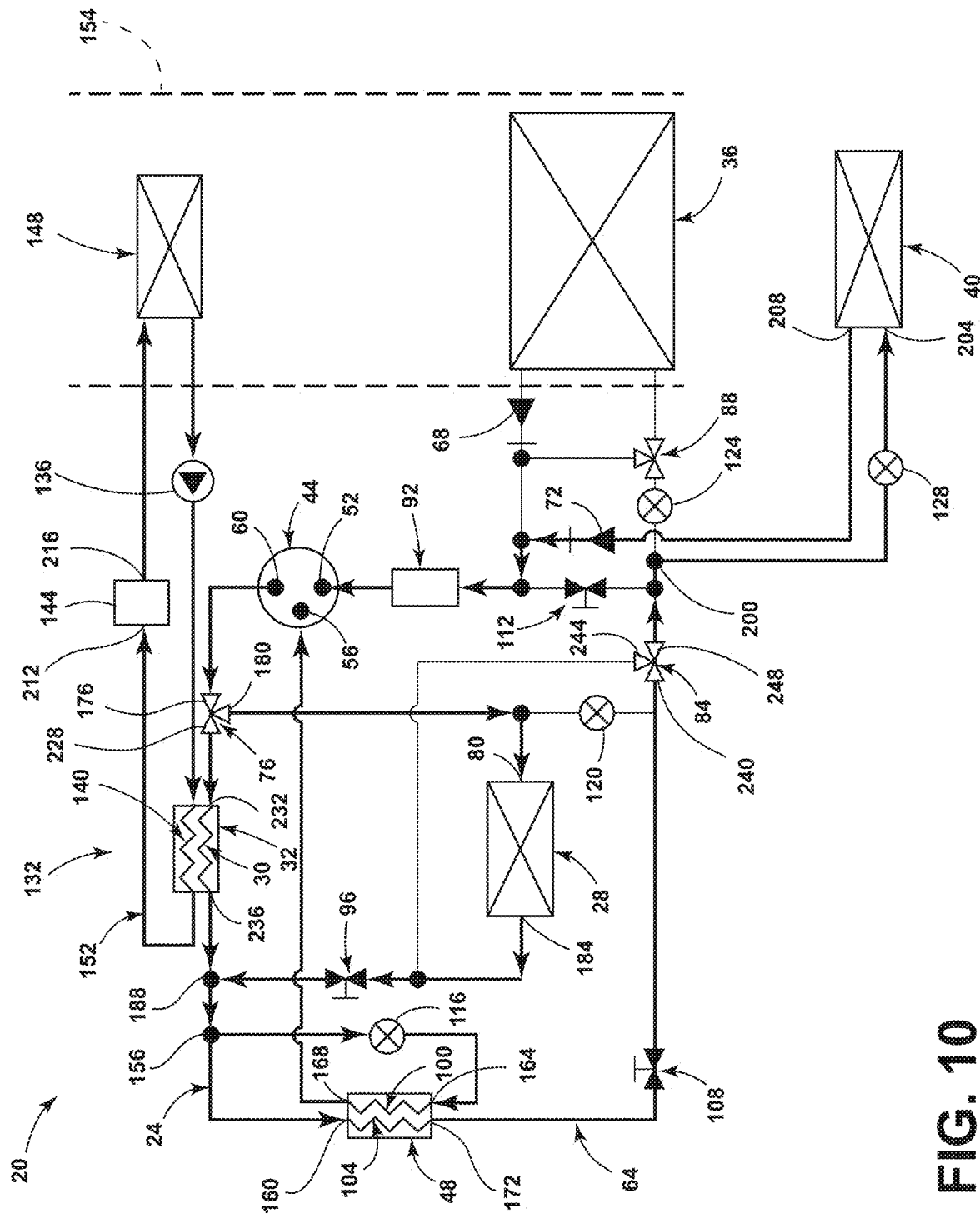
FIG. 10 is a schematic representation of the heat pump arrangement, illustrating a heating and deicing mode of operation, according to one example.
Figure 11:
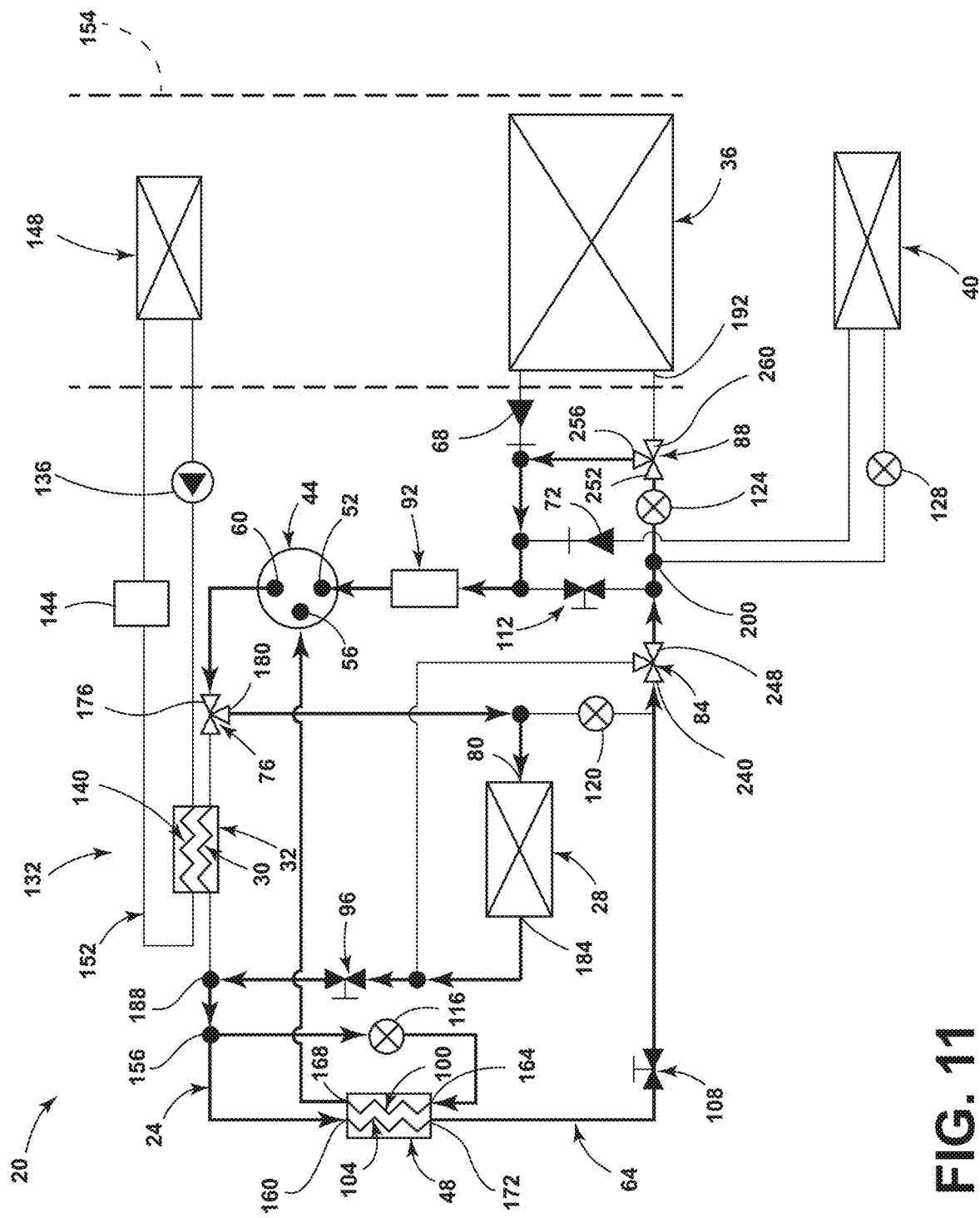
FIG. 11 is a schematic representation of the heat pump arrangement, illustrating a first deicing mode of operation, according to one example.
Figure 12:
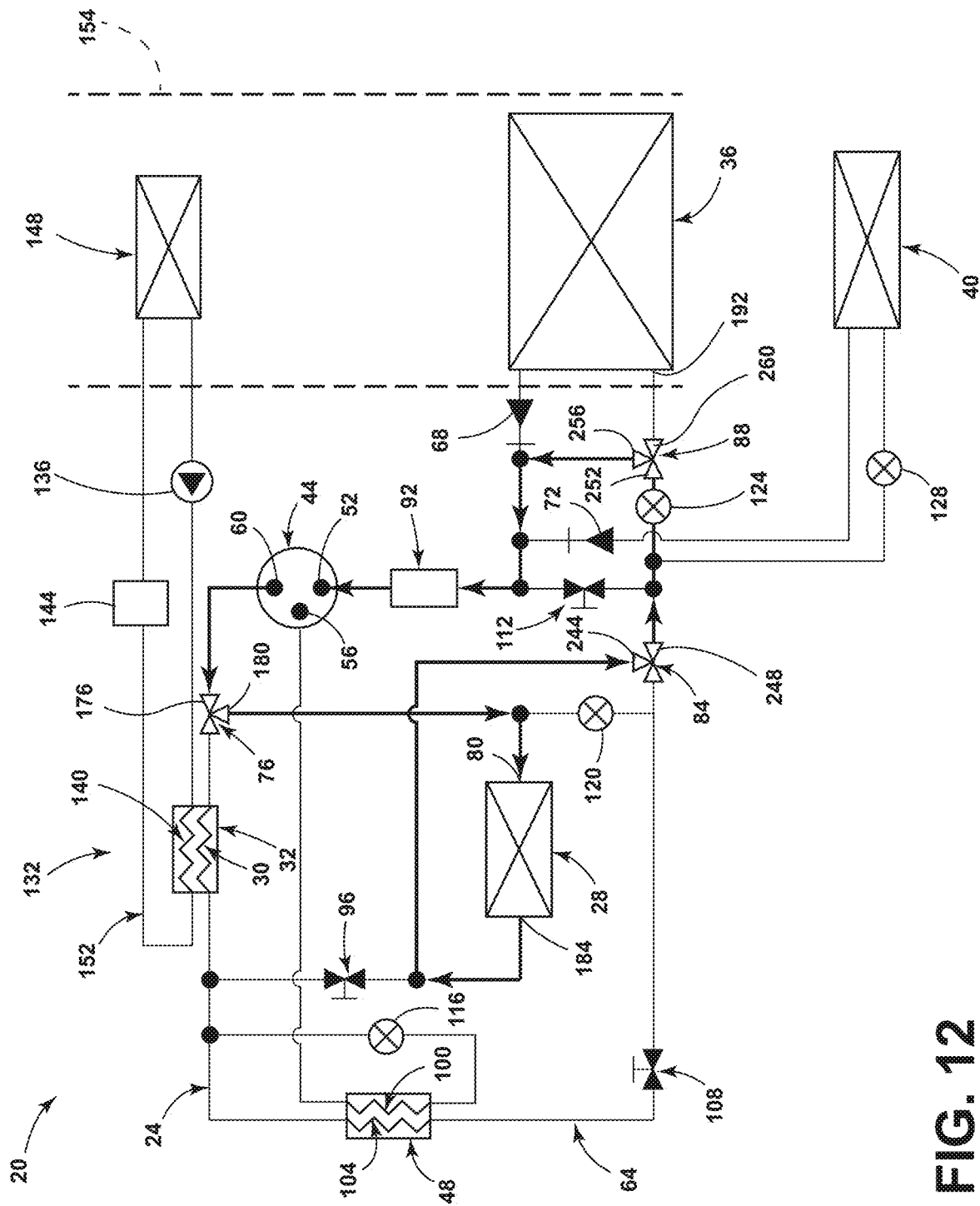
FIG. 12 is a schematic representation of the heat pump arrangement, illustrating a second deicing mode of operation, according to one example.

Referring now to FIGS. 10-12, a heating and deicing mode of operation (FIG. 10), a first deicing mode of operation (FIG. 11), and a second deicing mode of operation (FIG. 12) are depicted in exemplary form. In each of these modes of operation, the compressor 44 acts upon the first heat exchange fluid to drive the first heat exchange fluid from the outlet 60 toward the first three-way valve 76. More specifically, the compressor 44 drives the first heat exchange fluid toward the first port 176 of the first three-way valve 76. The positioning of the first three-way valve 76 in the mode of operation depicted in FIG. 10 is such that a first portion of the first heat exchange fluid that is received at the first port 176 is directed out of the second port 180 and a second portion of the first heat exchange fluid that is received at the first port 176 is directed out of the third port 228, as will be discussed in further detail herein. As a result of the positioning of the first three-way valve 76 in the modes of operation depicted in FIGS. 11 and 12, an entirety of the first heat exchange fluid that is received at the first port 176 is directed to exit the first three-way valve 76 at the second port 180 thereof.

In each of the modes of operation depicted in FIGS. 10-12, after exiting the second port 180 of the first three-way valve 76, the first heat exchange fluid is directed toward the inlet 80 of the first heat exchanger 28. As the first heat exchange fluid flows through the first heat exchanger 28, the first heat exchange fluid may thermally interact with a heat exchange fluid that is external to the refrigerant loop 24 and the coolant loop 132 (e.g., ambient air) such that heat may be removed from the first heat exchange fluid. The first heat exchange fluid exits the first heat exchanger 28 at the outlet 184 of the first heat exchanger 28. Upon exiting the first heat exchanger 28 by way of the outlet 184, the first heat exchange fluid is directed toward the first shutoff valve 96. In the modes of operation depicted in FIGS. 10 and 11, the first shutoff valve 96 is in an open position. Accordingly, in the modes of operation depicted in FIGS. 10 and 11, the first heat exchange fluid flows through the first shutoff valve 96 and encounters the first coupling point 188. In the mode of operation depicted in FIG. 12, the first shutoff valve 96 is in a closed position.

With specific reference to FIG. 10, the positioning of the first three-way valve 76 in this mode of operation is such that the first portion of the first heat exchange fluid that is received at the first port 176 is directed out of the second port 180 and the second portion of the first heat exchange fluid that is received at the first port 176 is directed out of the third port 228. From the third port 228 of the first three-way valve 76, the first heat exchange fluid is directed toward the inlet 232 of the first region 30 of the second heat exchanger 32. Within the second heat exchanger 32, the first heat exchange fluid thermally interacts with the second heat exchange fluid that is circulating through the coolant loop 132. The operation of the coolant loop 132 has been described above and operates in an identical manner in the depicted example. Accordingly, for the sake of brevity, the description of the operation of the coolant loop 132 is not repeated here. After thermally interacting with the second heat exchange fluid in the second heat exchanger 32, the first heat exchange fluid exits the first region 30 of the second heat exchanger 32 by way of the outlet 236 of the first region 30. Upon exiting the first region 30 of the second heat exchanger 32, the first heat exchange fluid is directed toward the first coupling point 188. At the first coupling point 188, the first heat exchange fluid is prevented from flowing toward the first shutoff valve 96 by a pressure of the first heat exchange fluid flowing from the first shutoff valve 96. At the first coupling point 188, the first and second portions of the first heat exchange fluid are recombined.

Referring to FIGS. 10 and 11, from the first coupling point 188, the first heat exchange fluid is directed toward the first branching point 156. As the first heat exchange fluid encounters the first branching point 156, a portion of the first heat exchange fluid is diverted toward the first expansion valve 116, while the remaining portion of the first heat exchange fluid continues toward the second region 104 of the vapor generator 48 in the manner already described. From the vapor generator 48, the first heat exchange fluid is directed toward the second shutoff valve 108.

With specific reference to FIG. 10, from the second shutoff valve 108, the first heat exchange fluid is directed toward the second three-way valve 84. The positioning of the second three-way valve 84 in this mode of operation is such that the first heat exchange fluid received by the second three-way valve 84 enters the first port 240 and is entirely directed to exit the second three-way valve 84 by way of the third port 248. In this mode of operation, the third shutoff valve 112 is in a closed position. From the third port 248 of the second three-way valve 84, the first heat exchange fluid is directed toward the second branching point 200. At the second branching point 200, the first heat exchange fluid is directed toward the fourth expansion valve 128 as a result of the positioning of the third three-way valve 88 or the third expansion valve 124 operating as a shutoff valve. Accordingly, in the depicted mode of operation, the first heat exchange fluid is not driven to the third three-way valve 88 by the compressor 44. The first heat exchange fluid experiences a decrease in pressure and temperature as a result of interaction with the fourth expansion valve 128. After exiting the fourth expansion valve 128, the first heat exchange fluid is directed toward the inlet 204 of the fourth heat exchanger 40. The decreased temperature and pressure of the first heat exchange fluid flowing through the fourth heat exchanger 40 as a result of interaction with the fourth expansion valve 128 can be employed to decrease the temperature of heat-producing components with which the fourth heat exchanger 40 interacts (e.g., electric motors, batteries, electronics, etc.). Accordingly, the first heat exchange fluid that exits the fourth heat exchanger 40 by way of the outlet 208 of the fourth heat exchanger 40 may have an increased pressure, temperature, and/or vapor percentage than the first heat exchange fluid that entered the fourth heat exchanger 40 at the inlet 204. Upon exiting the fourth heat exchanger 40 by way of the outlet 208, the first heat exchange fluid is directed toward the second check valve 72 by the refrigerant network of conduits 64. Once the first heat exchange fluid passes through the second check valve 72, the first heat exchange fluid is directed toward the accumulator 92. The first check valve 68 prevents back flow toward the third heat exchanger 36 in this mode of operation. Accordingly, the third heat exchanger 36 is prevented from becoming a storage vessel for the first heat exchange fluid when the third heat exchanger 36 is not employed in a given mode of operation. The accumulator 92 receives the first heat exchange fluid and provides a gaseous component of the first heat exchange fluid to the low-pressure inlet 52 of the compressor 44, thereby completing the traversal of the refrigerant loop 24 in the heating and deicing mode of operation.

Referring particularly to FIG. 11, from the second shutoff valve 108, the first heat exchange fluid is directed toward the second three-way valve 84. The positioning of the second three-way valve 84 in this mode of operation is such that the first heat exchange fluid is received at the first port 240 of the second three-way valve 84 and is entirely directed out of the third port 248. In this mode of operation, the third shutoff valve 112 is in a closed position. From the third port 248 of the second three-way valve 84, the first heat exchange fluid is directed toward the second branching point 200 toward the third expansion valve 124. The first heat exchange fluid experiences a decrease in pressure and temperature as a result of interaction with the third expansion valve 124. After exiting the third expansion valve 124, the first heat exchange fluid is directed toward a first port 252 of the third three-way valve 88. As a result of the positioning of the third three-way valve 88, the first heat exchange fluid that is received at the first port 252 is directed out of a second port 256 of the third three-way valve 88. A third port 260 of the third three-way valve 88 is directly coupled to the inlet 192 of the third heat exchanger 36. However, the positioning of the third three-way valve 88 in this mode of operation prevents the first heat exchange fluid that enters the first port 252 from exiting the third port 260.

Referring again to FIG. 11, the first heat exchange fluid that has undergone a decrease in pressure and temperature as a result of interaction with the third expansion valve 124 bypasses the third heat exchanger 36 and is instead directed toward the accumulator 92 by the second port 256. In so doing, the heat pump 20 may be operated in a situation where the first heat exchanger 28 is frozen while enabling an expansion of the first heat exchange fluid within the refrigerant loop 24. More specifically, the first heat exchange fluid increases in temperature, pressure, and/or vapor percentage as a result of interaction with the compressor 44. By directing the first heat exchange fluid to the inlet 80 of the first heat exchanger 28 after exiting the outlet 60 of the compressor 44, the first heat exchanger 28 may be thawed or deiced. However, if not for the expansion provided by the third expansion valve 124, the efficiency of the heat pump 20, the refrigerant loop 24, and/or the compressor 44 may be negatively impacted. Reference to the first heat exchanger 28 being frozen is intended to refer to a situation in which a liquid (e.g., water) has frozen on an exterior of the first heat exchanger 28. The source of the frozen liquid may be air-borne water vapor in the exterior environment, a relative humidity in the exterior environment, splash or spray from environmental sources (e.g., rain, snow, melted snow/salt mixtures, etc.) In this mode of operation, the first check valve 68 prevents backflow into the third heat exchanger 36. Similarly, the second check valve 72 prevents back flow into the fourth heat exchanger 40. Accordingly, the third and fourth heat exchangers 36, 40 are prevented from becoming storage vessels for the first heat exchange fluid when the third and fourth heat exchangers 36, 40 are not employed in a given mode of operation. The accumulator 92 receives the first heat exchange fluid and provides a gaseous component of the first heat exchange fluid to the low-pressure inlet 52 of the compressor 44, thereby completing the traversal of the refrigerant loop 24 in the first deicing mode of operation.

Referring now to FIG. 12, the flow of the first heat exchange fluid from the outlet 60 of the compressor 44 to the outlet 184 of the first heat exchanger 28 has been described above and is not repeated here for the sake of brevity. Upon exiting the first heat exchanger 28 by way of the outlet 184, the first heat exchange fluid is directed toward the first shutoff valve 96. In this mode of operation, the first shutoff valve 96 is in the closed position. Accordingly, the first heat exchange fluid is directed toward the second port 244 of the second three-way valve 88 after exiting the first heat exchanger 28. The positioning of the second three-way valve 84 is such that an entirety of the first heat exchange fluid received at the second port 244 is directed out of the third port 248. From the third port 248 of the second three-way valve 84, the first heat exchange fluid is directed toward the third expansion valve 124. The first heat exchange fluid experiences a decrease in pressure and temperature as a result of interaction with the third expansion valve 124. After exiting the third expansion valve 124, the first heat exchange fluid is directed toward the first port 252 of the third three-way valve 88. As a result of the positioning of the third three-way valve 88, an entirety of the first heat exchange fluid that is received at the first port 252 is directed out of the second port 256 of the third three-way valve 88. The third port 260 of the third three-way valve 88 is directly coupled to the inlet 192 of the third heat exchanger 36. However, the positioning of the third three-way valve 88 in this mode of operation prevents the first heat exchange fluid that enters the first port 252 from exiting the third port 260. Accordingly, the first heat exchange fluid that has undergone a decrease in pressure and temperature as a result of interaction with the third expansion valve 124 bypasses the third heat exchanger 36 and is instead directed toward the accumulator 92 by the second port 256. In this mode of operation, the first check valve 68 prevents backflow into the third heat exchanger 36. Similarly, the second check valve 72 prevents back flow into the fourth heat exchanger 40. Accordingly, the third and fourth heat exchangers 36, 40 are prevented from becoming storage vessels for the first heat exchange fluid when the third and fourth heat exchangers 36, 40 are not employed in a given mode of operation. The accumulator 92 receives the first heat exchange fluid and provides a gaseous component of the first heat exchange fluid to the low-pressure inlet 52 of the compressor 44, thereby completing the traversal of the refrigerant loop 24 in the second deicing mode of operation.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A heat pump, comprising:
 a refrigerant loop comprising:
  a first heat exchanger;
  a first region of a second heat exchanger;
  a third heat exchanger;
  a fourth heat exchanger;
  a compressor having a low-pressure inlet, a mid-pressure inlet, and an outlet;
  a vapor generator positioned downstream of the outlet of the compressor and upstream of both the low-pressure inlet and the mid-pressure inlet;
  a first check valve positioned immediately downstream of the third heat exchanger; and
  a second check valve positioned immediately downstream of the fourth heat exchanger.

2. The heat pump of claim 1, wherein the refrigerant loop further comprises:
 a first three-way valve positioned downstream of the outlet of the compressor and upstream of an inlet of the first heat exchanger, wherein the first three-way valve is positioned upstream of the first region of the second heat exchanger.

3. The heat pump of claim 2, wherein the refrigerant loop further comprises:
 a second three-way valve positioned immediately downstream of the first heat exchanger.

4. The heat pump of claim 3, wherein the refrigerant loop further comprises:
 a third three-way valve positioned immediately upstream of the third heat exchanger, wherein the third three-way valve enables a bypassing of the third heat exchanger.

5. The heat pump of claim 4, wherein the refrigerant loop further comprises:
 an accumulator positioned immediately upstream of the low-pressure inlet of the compressor.

6. The heat pump of claim 1, wherein the refrigerant loop further comprises:
 a first shutoff valve plumbed in series with the first heat exchanger, wherein the first shutoff valve is positioned downstream of the first heat exchanger.

7. The heat pump of claim 6, wherein the refrigerant loop further comprises:
 a second shutoff valve plumbed in series with a second region of the vapor generator, wherein the second shutoff valve is positioned downstream of the second region of the vapor generator.

8. The heat pump of claim 7, wherein the refrigerant loop further comprises:
 a third shutoff valve positioned downstream of a second three-way valve, wherein the second three-way valve is positioned immediately downstream of the first heat exchanger and immediately downstream of the second shutoff valve.

9. The heat pump of claim 1, wherein the vapor generator is a liquid-gas separator valve.

10. The heat pump of claim 1, wherein the vapor generator is a plate-style heat exchanger.

11. The heat pump of claim 10, wherein the refrigerant loop further comprises:
 a first expansion valve positioned upstream of a first region of the vapor generator.

12. The heat pump of claim 11, wherein the refrigerant loop further comprises:
 a second expansion valve positioned upstream of the first heat exchanger.

13. The heat pump of claim 12, wherein the refrigerant loop further comprises:
 a third expansion valve positioned upstream of the third heat exchanger.

14. The heat pump of claim 13, wherein the refrigerant loop further comprises:
 a fourth expansion valve positioned immediately upstream of the fourth heat exchanger.

15. The heat pump of claim 1, further comprising:
 a coolant loop comprising:
  a second region of the second heat exchanger;
  a pump;
  a fifth heat exchanger;
  a reservoir; and
  a coolant network of conduits that fluidly couples components of the coolant loop.

16. A heat pump, comprising:
 a refrigerant loop comprising:
  a first heat exchanger;
  a first region of a second heat exchanger;
  a third heat exchanger;
  a fourth heat exchanger;
  a compressor having a low-pressure inlet, a mid-pressure inlet, and an outlet;
  a vapor generator positioned downstream of the outlet of the compressor and upstream of both the low-pressure inlet and the mid-pressure inlet;
  a first check valve positioned immediately downstream of the third heat exchanger;
  a second check valve positioned immediately downstream of the fourth heat exchanger;
  a first three-way valve positioned downstream of the outlet of the compressor and upstream of an inlet of the first heat exchanger, wherein the first three-way valve is positioned upstream of the first region of the second heat exchanger;
  a second three-way valve positioned immediately downstream of the first heat exchanger;
  a third three-way valve positioned immediately upstream of the third heat exchanger;
  a first shutoff valve plumbed in series with the first heat exchanger, wherein the first shutoff valve is positioned downstream of the first heat exchanger;
  a second shutoff valve plumbed in series with a second region of the vapor generator, wherein the second shutoff valve is positioned downstream of the second region of the vapor generator; and
  a third shutoff valve positioned downstream of the second three-way valve, wherein the second three-way valve is positioned immediately downstream of the second shutoff valve.

17. The heat pump of claim 16, wherein the vapor generator is a liquid-gas separator valve.

18. The heat pump of claim 16, wherein the vapor generator is a plate-style heat exchanger.

19. The heat pump of claim 16, wherein the refrigerant loop further comprises:
 a first expansion valve positioned upstream of a first region of the vapor generator;
 a second expansion valve positioned upstream of the first heat exchanger;
 a third expansion valve positioned upstream of the third heat exchanger, wherein the third three-way valve enables a bypassing of the third heat exchanger while maintaining use of the third expansion valve; and
 a fourth expansion valve positioned immediately upstream of the fourth heat exchanger.

20. The heat pump of claim 16, further comprising:
a coolant loop comprising:
- a second region of the second heat exchanger;
- a pump;
- a fifth heat exchanger;
- a reservoir; and
- a coolant network of conduits that fluidly couples components of the coolant loop.

\* \* \* \* \*